United States Patent
Green et al.

(10) Patent No.: US 11,585,642 B2
(45) Date of Patent: Feb. 21, 2023

(54) SOFTWARE AND SENSOR SYSTEM FOR CONTROLLING RANGE EQUIPMENT

(71) Applicant: Action Target Inc., Provo, UT (US)

(72) Inventors: Joseph Green, Herriman, UT (US); Cory Haflett, Saratoga Springs, UT (US); Tim Hakala, Lindon, UT (US); David Sharp, Redmond, WA (US); Christopher Hess, Santaquin, UT (US); Devin Anderson, Orem, UT (US)

(73) Assignee: Action Target Inc., Provo, UT (US)

( * ) Notice: Subject to any disclaimer, the term of this patent is extended or adjusted under 35 U.S.C. 154(b) by 22 days.

(21) Appl. No.: 17/120,669

(22) Filed: Dec. 14, 2020

(65) Prior Publication Data
US 2021/0208557 A1    Jul. 8, 2021

Related U.S. Application Data

(63) Continuation of application No. 15/867,584, filed on Jan. 10, 2018, now Pat. No. 10,876,821.

(60) Provisional application No. 62/446,424, filed on Jan. 14, 2017, provisional application No. 62/446,281, filed on Jan. 13, 2017.

(51) Int. Cl.
| | |
|---|---|
| *A63F 9/02* | (2006.01) |
| *F41J 9/02* | (2006.01) |
| *F41J 1/10* | (2006.01) |
| *F41J 7/06* | (2006.01) |
| *F41J 7/04* | (2006.01) |
| *G05B 19/042* | (2006.01) |

(52) U.S. Cl.
CPC . *F41J 9/02* (2013.01); *F41J 1/10* (2013.01); *F41J 7/04* (2013.01); *F41J 7/06* (2013.01); *G05B 19/042* (2013.01); *G05B 2219/24033* (2013.01)

(58) Field of Classification Search
CPC . F41J 7/02; F41J 1/10; F41J 9/02; F41J 5/00; A63F 9/02; A63F 9/0204; A63F 9/0243
See application file for complete search history.

(56) References Cited

U.S. PATENT DOCUMENTS

| | | |
|---|---|---|
| 157,335 A | 12/1874 | Lyon |
| 429,942 A | 6/1890 | McBride |
| 483,060 A | 9/1892 | Holm |
| 570,820 A | 11/1896 | Scratton |
| 631,175 A | 8/1899 | Parnail |

(Continued)

FOREIGN PATENT DOCUMENTS

| | | |
|---|---|---|
| CA | 2100631 | 2/1994 |
| GB | 2136932 | 9/1984 |

(Continued)

OTHER PUBLICATIONS

Caswell International Corp., Product Literature, Copyright 2002.

(Continued)

*Primary Examiner* — Omkar A Deodhar
(74) *Attorney, Agent, or Firm* — Bateman IP; Randall B. Bateman

(57) ABSTRACT

The present invention relates to systems and methods for accurately and safely directing the movement of shooting range targets, and more specifically, to provide self-calibration and synchronicity to programmable target carriers and automatically resetting targets.

24 Claims, 12 Drawing Sheets

(56) References Cited

U.S. PATENT DOCUMENTS

| | | |
|---|---|---|
| 840,610 A | 1/1907 | Easdale |
| 879,670 A | 2/1908 | Petry |
| 937,733 A | 10/1909 | Worrell |
| 950,101 A | 2/1910 | Green |
| 960,085 A | 5/1910 | Giles |
| 960,892 A | 6/1910 | Gates |
| 1,025,944 A | 5/1912 | Elliott |
| 1,036,879 A | 8/1912 | Miner |
| 1,207,456 A | 12/1916 | Whelan |
| 1,348,283 A | 8/1920 | Koehl |
| 1,424,632 A | 8/1922 | Fenton |
| 1,517,461 A | 8/1924 | Robinson |
| 1,540,802 A | 6/1925 | Ordway |
| 1,543,605 A | 6/1925 | Gavard |
| 1,559,171 A | 10/1925 | Knowles |
| 1,657,931 A | 7/1926 | Krantz |
| 1,640,954 A | 8/1927 | Mach |
| 1,738,874 A | 12/1929 | Domingo |
| 1,831,289 A | 11/1931 | Dally |
| 2,048,155 A | 1/1935 | Armantrout |
| 2,008,359 A | 7/1935 | Lamb |
| 2,039,552 A | 5/1936 | Reynolds |
| 2,085,933 A | 7/1937 | Vaughan |
| 2,104,171 A | 1/1938 | Schwerin |
| 2,179,471 A | 11/1939 | Lee |
| 2,284,510 A | 5/1942 | Cates |
| 2,290,297 A | 7/1942 | Smith |
| 2,344,829 A | 3/1944 | McAvoy |
| 2,372,111 A | 3/1945 | Norberg |
| 2,547,478 A | 7/1948 | Lieberman |
| 2,538,118 A | 6/1949 | Miller |
| 2,483,690 A | 10/1949 | Carlson |
| 2,494,210 A | 1/1950 | Robinson |
| 2,535,280 A | 12/1950 | Gartrell |
| 2,586,958 A | 2/1952 | Keller |
| 2,587,042 A | 2/1952 | Haiselup |
| 2,613,934 A | 10/1952 | Tabler |
| 2,706,634 A | 4/1955 | Valkenburg |
| 2,809,836 A | 10/1957 | Clair |
| 2,838,309 A | 6/1958 | Merz et al. |
| 2,819,903 A | 8/1958 | Saunders |
| 2,905,469 A | 9/1959 | Taylor |
| 2,957,694 A | 10/1960 | Barber |
| 2,967,712 A | 1/1961 | Breitenfeldt |
| 3,014,725 A | 12/1961 | Lewis |
| 3,032,808 A | 5/1962 | Fleming |
| 3,064,976 A | 11/1962 | Kuhn |
| 3,087,701 A | 4/1963 | Wallace |
| 3,103,362 A | 9/1963 | Elofson |
| 3,113,773 A | 12/1963 | Ripepe |
| 3,140,874 A | 7/1964 | Jensen et al. |
| 3,233,904 A | 2/1966 | Gillam et al. |
| 3,348,843 A | 10/1967 | Stanley |
| 3,363,900 A | 1/1968 | Cadle |
| 3,385,405 A | 5/1968 | Cullen |
| 3,392,980 A | 7/1968 | Ortega |
| 3,422,538 A | 1/1969 | Panissidi |
| 3,443,505 A | 5/1969 | Kaufman |
| 3,471,153 A | 10/1969 | Baumler |
| 3,510,133 A | 5/1970 | Gretzky |
| 3,515,388 A | 6/1970 | Zachmeier |
| 3,540,729 A | 11/1970 | Rahberger |
| 3,601,353 A | 8/1971 | Dale |
| 3,614,102 A | 10/1971 | Nikoden, Sr. |
| 3,638,894 A | 2/1972 | Leutenegger |
| 3,650,179 A | 3/1972 | Stenger |
| 3,720,138 A | 3/1973 | Van Scoy |
| 3,720,411 A | 3/1973 | Vogelaere |
| 3,755,942 A | 9/1973 | Samsing |
| 3,802,098 A | 4/1974 | Sampson et al. |
| 3,889,466 A | 6/1975 | Castela et al. |
| 3,914,879 A | 10/1975 | Taylor, III |
| 3,992,007 A | 11/1976 | Seeman |
| 4,072,313 A | 2/1978 | Murso et al. |
| 4,076,247 A | 2/1978 | Kim et al. |
| 4,084,299 A | 4/1978 | Noda |
| 4,086,711 A | 5/1978 | Gammarino et al. |
| 4,177,835 A | 12/1979 | Paley |
| 4,182,094 A | 1/1980 | Leider et al. |
| 4,184,802 A | 1/1980 | Cook et al. |
| 4,205,847 A | 6/1980 | Steiger et al. |
| 4,228,569 A | 10/1980 | Snyder |
| 4,232,867 A | 11/1980 | Tate, Sr. |
| 4,249,743 A | 2/1981 | Lee |
| 4,288,080 A | 9/1981 | Laporte et al. |
| 4,294,452 A | 10/1981 | Schlotter et al. |
| 4,340,370 A | 7/1982 | Marshall et al. |
| 4,361,330 A | 11/1982 | Scharer |
| 4,395,045 A | 7/1983 | Baer |
| 4,440,399 A | 4/1984 | Smith |
| 4,501,427 A | 2/1985 | Payne |
| 4,506,416 A | 3/1985 | Ohminato et al. |
| 4,524,976 A | 6/1985 | Seitz et al. |
| 4,540,182 A | 9/1985 | Clement |
| 4,546,984 A | 10/1985 | Towle et al. |
| 4,614,345 A | 9/1986 | Doughty |
| 4,657,261 A | 4/1987 | Saunders |
| 4,691,925 A | 9/1987 | Scholem |
| 4,706,963 A | 11/1987 | Geuss |
| 4,726,593 A | 2/1988 | Wade |
| 4,739,996 A | 4/1988 | Vedder |
| 4,743,032 A | 5/1988 | Summers et al. |
| 4,786,059 A | 11/1988 | Barini |
| 4,807,888 A | 2/1989 | Pidde |
| 4,844,476 A | 7/1989 | Becker |
| 4,890,847 A | 1/1990 | Cartee et al. |
| 4,898,391 A | 2/1990 | Kelly et al. |
| 4,911,453 A | 3/1990 | Essex et al. |
| 4,913,389 A | 4/1990 | McCracken |
| 4,953,875 A | 9/1990 | Sudit |
| 4,979,752 A | 12/1990 | Fosseen |
| 5,054,723 A | 10/1991 | Arnold |
| 5,145,133 A | 9/1992 | France |
| 5,163,689 A | 11/1992 | Bateman |
| 5,213,336 A | 5/1993 | Bateman |
| 5,232,227 A | 8/1993 | Bateman |
| 5,240,258 A | 8/1993 | Bateman |
| 5,242,172 A | 9/1993 | Bateman |
| 5,257,790 A | 11/1993 | Meadows |
| 5,263,721 A | 11/1993 | Lowrance |
| 5,277,432 A | 1/1994 | Bateman |
| 5,316,479 A | 5/1994 | Wong et al. |
| 5,324,043 A | 6/1994 | Estrella |
| 5,346,226 A | 9/1994 | Block |
| 5,350,180 A | 9/1994 | Acock |
| 5,352,170 A | 10/1994 | Condo et al. |
| 5,361,455 A | 11/1994 | Kiefer |
| 5,400,692 A | 3/1995 | Bateman |
| 5,433,451 A | 7/1995 | De Vries |
| 5,535,662 A | 7/1996 | Bateman |
| 5,598,996 A | 2/1997 | Rath |
| 5,605,335 A | 2/1997 | Simpson |
| 5,618,044 A | 4/1997 | Bateman |
| 5,621,950 A | 4/1997 | White |
| 5,636,995 A | 6/1997 | Sharpe, III et al. |
| 5,641,288 A | 6/1997 | Zaenglein, Jr. |
| 5,648,794 A | 7/1997 | Jelsma et al. |
| 5,649,706 A | 7/1997 | Treat, Jr. et al. |
| 5,676,378 A | 10/1997 | West |
| 5,695,196 A | 12/1997 | Yanosky |
| 5,765,832 A | 6/1998 | Huff |
| 5,768,972 A | 6/1998 | Christenson et al. |
| 5,802,460 A | 9/1998 | Parvulescu et al. |
| 5,811,718 A | 9/1998 | Bateman |
| 5,822,936 A | 10/1998 | Bateman |
| 5,829,753 A | 11/1998 | Wiser |
| 5,848,791 A * | 12/1998 | Beyer ............... F41J 9/02 |
| | | 273/359 |
| 5,865,439 A | 2/1999 | Marcuson |
| 5,906,552 A | 5/1999 | Padilla |
| 5,907,930 A | 6/1999 | Ricco |
| 5,934,678 A | 8/1999 | Theissen et al. |
| 5,947,477 A | 9/1999 | Turnipseed |
| 5,950,283 A | 9/1999 | Sato |

(56) References Cited

U.S. PATENT DOCUMENTS

| | | |
|---|---|---|
| 5,951,016 A | 9/1999 | Bateman |
| 5,963,624 A | 10/1999 | Pope |
| 5,967,522 A | 10/1999 | Corcoran et al. |
| 5,967,523 A | 10/1999 | Brownlee |
| 5,988,645 A | 11/1999 | Downing |
| 6,018,847 A | 2/2000 | Lu |
| 6,109,614 A | 8/2000 | Ciarcia |
| 6,223,029 B1 | 4/2001 | Stenman et al. |
| 6,230,214 B1 | 5/2001 | Liukkonen et al. |
| 6,283,756 B1 | 9/2001 | Danckwerth et al. |
| 6,289,213 B1 | 9/2001 | Flint et al. |
| 6,308,062 B1 | 10/2001 | Chien et al. |
| 6,311,980 B1 | 11/2001 | Sovine et al. |
| 6,322,444 B1 | 11/2001 | Matsui et al. |
| 6,325,376 B1 | 12/2001 | Elliott et al. |
| 6,328,651 B1 | 12/2001 | Lebensfeld et al. |
| 6,332,243 B1 | 12/2001 | Kim |
| 6,378,870 B1 | 4/2002 | Sovine |
| 6,398,215 B1 | 6/2002 | Carroll |
| 6,463,299 B1 | 10/2002 | Macor |
| 6,478,301 B1 | 11/2002 | Witmeyer |
| 6,484,990 B1 | 11/2002 | Marshall |
| 6,502,820 B2 | 1/2003 | Slifko |
| 6,533,280 B1 | 3/2003 | Sovine et al. |
| 6,543,778 B2 | 4/2003 | Baker |
| 6,575,753 B2 | 6/2003 | Rosa et al. |
| 6,588,759 B1 | 7/2003 | Bateman |
| 6,679,795 B2 | 1/2004 | Ouimette et al. |
| 6,718,596 B2 | 4/2004 | Kohlstrand et al. |
| 6,728,546 B1 | 4/2004 | Peterson et al. |
| RE38,540 E | 6/2004 | Bateman |
| 6,761,357 B2 | 6/2004 | Witt |
| 6,776,418 B1 | 8/2004 | Sovine et al. |
| 6,808,177 B2 | 10/2004 | Dehart |
| 6,808,178 B1 | 10/2004 | Sovine |
| 6,896,267 B1 | 5/2005 | Le Anna |
| 6,975,859 B1 | 12/2005 | Lambert et al. |
| 6,994,347 B2 | 2/2006 | Tessel et al. |
| 6,994,348 B2 | 2/2006 | Lambert et al. |
| 6,994,349 B2 | 2/2006 | Lambert et al. |
| 7,114,725 B2 | 10/2006 | Camp |
| 7,128,321 B1 | 10/2006 | Brown |
| 7,134,977 B2 | 11/2006 | Campbell et al. |
| 7,140,615 B1 | 11/2006 | Sovine et al. |
| 7,175,181 B1 | 2/2007 | Bateman et al. |
| 7,194,944 B2 | 3/2007 | Lambert et al. |
| 7,201,376 B2 | 4/2007 | Kuosa |
| 7,219,897 B2 | 5/2007 | Sovine et al. |
| 7,234,890 B1 | 6/2007 | Marshall et al. |
| 7,264,246 B2 | 9/2007 | Sovine et al. |
| 7,275,748 B2 | 10/2007 | Lambert et al. |
| 7,302,768 B2 | 12/2007 | Gajdacs |
| 7,303,192 B2 | 12/2007 | Marshall et al. |
| 7,306,230 B2 | 12/2007 | Lambert et al. |
| 7,322,771 B1 | 1/2008 | Marshall et al. |
| 7,427,069 B2 | 9/2008 | Bateman et al. |
| 7,431,302 B2 | 10/2008 | Bassett et al. |
| 7,448,967 B1 | 11/2008 | Panneri |
| 7,469,903 B2 | 12/2008 | Marshall et al. |
| 7,497,441 B2 | 3/2009 | Marshall et al. |
| 7,503,250 B2 | 3/2009 | Lambert et al. |
| 7,556,268 B2 | 7/2009 | Bateman et al. |
| 7,653,979 B2 | 2/2010 | Bateman et al. |
| 7,775,526 B1 | 8/2010 | Lambert et al. |
| 7,793,937 B2 | 9/2010 | Bateman et al. |
| 7,815,192 B1 | 10/2010 | Kreiman et al. |
| 7,823,466 B2 | 11/2010 | Glass |
| 7,914,004 B2 | 3/2011 | Wright et al. |
| 7,950,666 B2 | 5/2011 | Stincelli et al. |
| 8,006,981 B2 | 8/2011 | Gibson |
| 8,016,291 B2 | 9/2011 | Wright et al. |
| 8,091,896 B2 | 1/2012 | Lambert et al. |
| 8,128,094 B2 | 3/2012 | Lambert et al. |
| 8,162,319 B2 | 4/2012 | Stincelli et al. |
| 8,276,916 B2 | 10/2012 | Bateman et al. |
| 8,469,364 B2 | 6/2013 | Bassett et al. |
| 8,485,529 B2 | 7/2013 | Bateman et al. |
| 8,550,465 B2 | 10/2013 | Wright et al. |
| 8,579,294 B2 | 11/2013 | Wright et al. |
| 8,684,361 B2 | 4/2014 | Henson et al. |
| 8,713,829 B1 | 5/2014 | Crofford |
| 8,806,952 B1 | 8/2014 | Glass |
| 8,813,401 B2 | 8/2014 | Diercks |
| 8,827,273 B2 | 9/2014 | John et al. |
| 9,157,706 B2 | 10/2015 | Shea |
| 9,217,623 B2 | 12/2015 | Sovine et al. |
| 9,228,810 B2 | 1/2016 | Bateman et al. |
| 9,360,283 B1 * | 6/2016 | Tejada ............... F41J 1/10 |
| 9,482,498 B1 | 11/2016 | Miller |
| 9,513,091 B2 | 12/2016 | Roberts |
| 9,574,855 B2 | 2/2017 | Davis |
| 9,784,538 B2 | 10/2017 | Sovine et al. |
| 2005/0001381 A1 | 1/2005 | Lambert et al. |
| 2005/0022658 A1 | 2/2005 | Bateman |
| 2005/0034594 A1 | 2/2005 | Parks et al. |
| 2006/0107985 A1 | 5/2006 | Sovine |
| 2006/0234069 A1 | 10/2006 | Sovine et al. |
| 2006/0240388 A1 | 10/2006 | Marshall et al. |
| 2006/0240391 A1 | 10/2006 | Sovine et al. |
| 2006/0290063 A1 | 12/2006 | Hagar |
| 2006/0290064 A1 | 12/2006 | Hagar |
| 2007/0072537 A1 | 3/2007 | Bateman et al. |
| 2007/0102883 A1 | 5/2007 | Parks et al. |
| 2007/0234800 A1 | 10/2007 | Stout et al. |
| 2008/0047365 A1 | 2/2008 | Hsieh |
| 2008/0185786 A1 | 8/2008 | Loveland et al. |
| 2008/0216645 A1 | 9/2008 | Jacobsen et al. |
| 2008/0277876 A1 | 11/2008 | Riley |
| 2009/0014961 A1 | 1/2009 | Bateman et al. |
| 2009/0206551 A1 | 8/2009 | Parks et al. |
| 2010/0311015 A1 | 12/2010 | Sovine et al. |
| 2011/0024985 A1 | 2/2011 | Potterfield |
| 2011/0062668 A1 | 3/2011 | Leimberer |
| 2011/0233869 A1 | 9/2011 | John et al. |
| 2012/0187631 A1 | 7/2012 | John et al. |
| 2012/0193872 A1 | 8/2012 | Henson et al. |
| 2012/0247314 A1 | 10/2012 | Bassett et al. |
| 2012/0274028 A1 | 11/2012 | Sudbeck et al. |
| 2013/0106059 A1 | 5/2013 | Larue |
| 2013/0207347 A1 | 8/2013 | Sovine et al. |
| 2014/0138916 A1 | 5/2014 | Wright et al. |
| 2014/0232068 A1 | 8/2014 | Henson et al. |
| 2015/0260486 A1 | 9/2015 | Trimbath |
| 2015/0276356 A1 | 10/2015 | Cesternino |
| 2015/0292842 A1 | 10/2015 | Pixton |
| 2015/0330747 A1 | 11/2015 | Ferrell |
| 2015/0330748 A1 | 11/2015 | Anzalone |
| 2016/0195371 A1 | 7/2016 | Bateman et al. |
| 2016/0209182 A1 | 7/2016 | Sovine et al. |
| 2016/0209184 A1 | 7/2016 | Anderson et al. |
| 2017/0350677 A1 | 12/2017 | Sovine et al. |
| 2018/0172409 A1 | 6/2018 | Anderson et al. |
| 2018/0180372 A1 | 6/2018 | Scott et al. |
| 2018/0180373 A1 | 6/2018 | Scott et al. |
| 2018/0202777 A1 | 7/2018 | Green et al. |
| 2018/0209767 A1 | 7/2018 | Anderson et al. |
| 2018/0299232 A1 | 10/2018 | Thompson |
| 2019/0145172 A1 | 5/2019 | Parker |
| 2019/0212107 A1 | 7/2019 | Sharp et al. |
| 2019/0219369 A1 | 7/2019 | Harmon et al. |
| 2019/0219370 A1 | 7/2019 | Anderson et al. |
| 2020/0208947 A1 | 7/2020 | DeCosta et al. |

FOREIGN PATENT DOCUMENTS

| | | |
|---|---|---|
| GB | 2 187 270 | 9/1987 |
| GB | 2533147 A | 6/2016 |
| WO | WO 2010/119440 A1 | 10/2010 |

OTHER PUBLICATIONS

Duelatron, Product Literature 1995.
Law Enforcement Targets, Inc., Product Literature, Jul. 8, 2003.

(56) References Cited

OTHER PUBLICATIONS

Law Enforcement Targets, Inc., Product Literature, Oct. 12, 2004.
Law Enforcement Targets, Inc., Product Literature, Jun. 26, 2007.
Metal Spinning Target, Inc., Dueling Trees, Jul. 8, 2003.
Mike Gibson Manufacturing, Dueling Tree, Jul. 8, 2003.
Outwest MFG. Products, Product Literature, Jul. 8, 2003.
Porta Target, Product Literature, Circa 2000.
Shootrite, Tactical Training Target, published prior to Apr. 4, 2005.
Action Target DRM Pro, available at <https://www.actiontarget.com/products/drm_pro/>.

* cited by examiner

SOFTWARE AND SENSOR SYSTEM FOR CONTROLLING RANGE EQUIPMENT

TECHNICAL FIELD

The present invention relates to software, methods and systems for the operation for target range equipment, and more specifically to self-calibration or correction for moveable target systems.

BACKGROUND

In shooting ranges, targets and bullet traps are often provided to assist a shooter in improving his or her ability to reliably hit a target. While shooting at a stationary target is beneficial, shooting at moving or changing targets more accurately replicates real life situations. This is particularly true for law enforcement officers and military personnel. If an officer or soldier can be taught to quickly and accurately make "shoot" or "no shoot" decisions in a high stress environment, the risk to both the officer/soldier and the general public is reduced. Acquiring this skill, however, takes considerable training in life-like scenarios.

To replicate real life situations, targets may move forward and back on tracks, may run side-to-side, or may rotate or swing in a generally fixed position. In some scenarios, a shooter may practice firing at a rapidly-approaching target, simulating an attack, while other scenarios include the target or multiple targets moving laterally across the shooter's field of vision.

In other training exercises, the target may be rotated 90 degrees in either direction to show one of two faces of the target. One face shows an image consistent with a "shoot situation," such as a person holding a gun aimed at the shooter. The opposing side shows a "no shoot situation," such as a person holding a cell phone, or a criminal standing behind a hostage. Still other targets are designed to indicate when the target has been incapacitated.

In some training exercises, often called "dual running man" scenarios, two target carriers run simultaneously on the same track, adjacent tracks or overhead cable(s). The target or targets pass sideways or laterally across the shooter's field of vision. One carrier may edge a little forward of the other so that its target peeks out from behind the other, or the targets may travel together, only to unexpectedly separate and head in different directions. This may simulate a hostage scenario, in which a dangerous individual is pulling an innocent individual along and using him for cover. To allow repeated training, these target systems are usually motorized, or automatically resetting, so that the target systems run multiple cycles or at least so users can press a button to reset the targets to their original locations.

Moving or pivoting targets, however, are subject to increasing malfunctions over time. Moving track-mounted target carriers often gradually lose their calibration. The target carriers may be struck by bullet fragments, or may lose calibration simply because of sudden stops, starts, or jolting movements combined with slippage of the drive cable. This results in a target carrier which may be directed to collide against the track-stop on one end of the track, potentially causing damage to components, or which increasingly stops in the wrong place—thereby interfering with the training scenarios. Likewise, a user may not be able to direct a poorly-calibrated target carrier close enough for the user to change out the target attached to the carrier. The miscalibration may also put additional strain on the motor and the cable, and decrease the length of time the target carrier can operate between maintenance visits.

In a dual target scenario, an error regarding the position of the target carrier may result in the second target not being covered by the first target when the opposite is desired, or may result in one or both of the targets arriving at a desired position either too early or too late. Either way, it can interfere with proper execution of the training scenario.

Swinging or pivoting target paddles may, when struck by a bullet, pivot or fall only part of the way. For example, a drop (or bobber) target may not fall all of the way and therefore not properly indicate that it has been struck or may not be properly returned to its original position. Likewise, a turn target may get off its initial calibration so that when rotated the image on the target is not clearly presented to the shooter.

Moving target carriers and motorized pivoting targets are often controlled with a button or switch, and often operate at a single speed only. It may thus be difficult for a user to precisely position the target or make an appropriate correction. When a user attempts to make fine adjustments in position, the target carrier or target paddle may sway and jerk as it is repeatedly started and stopped by the motor. Additionally, this sudden stopping and starting may loosen the attachment of a target silhouette to the motorized portion of the target system. This can be hazardous—if a target silhouette is held to the motorized portion by, for example, clips, the clips may be shaken off by the movement, causing the target to fall off. It then cannot be retrieved without stopping all shooting on the range. Fallen metallic clips or even targets may present a danger of bullet deflection.

Track-mounted target carriers are costly, and are used in an environment that can increase the likelihood of mechanical errors. For example, there may be lead dust in the range, and target carriers as well as target carrier rails and cables may be struck by stray bullets. Because of this, some types of target carriers are error prone—e.g., a bullet dent in a rail may cause the target carrier to drag and become damaged, which then causes the target carrier motor to burn out prematurely—and expensive to repair.

Likewise, motorized pivoting or swinging targets may be susceptible to mechanical errors. Because these target systems are typically intended to be picked up and moved, their motor and drive systems are low powered and self-contained. Some operate from 12-volt batteries. It is thus advantageous if a motorized target system is both smart enough to halt activity if damage or unusual events are detected, and requires very little power to run. It is further advantageous if the target system provides for several means of notifying users of faults.

Further, servicing a target system can typically only be done after closing or when the rest of the range is shut down, due to the danger of entering a range while shooters are active. Thus, it is beneficial if the target system requires very little servicing and/or that the need for servicing can be more accurately predicted so that it can be performed when the range is not in use.

It is also beneficial if target systems are programmable. For example, carriers that can be instructed to perform particular maneuvers such as turns, approaches, and retreats on their own via a program, without the need for a shooter to continuously hold down a direction button. It is advantageous if stationary motorized or automatically resetting targets can be programmed to present their target face to shooters at intervals, to turn the target face part way to present a smaller and more challenging target, and the like.

An additional challenge is synchronicity. Most of these target installations—whether the targets are turning, bobbing, or moving—are not used in isolation. Rather, it is typical for several of these mechanized targets to be placed on a range, to be simultaneously fired at by multiple shooters. Targets which move or turn at a different rate from their neighboring targets results in some of the shooters having an easier or harder challenge to hit such targets. For example, if all officers are given 5 seconds to place 5 kill shots in the torso and some targets turn more slowly or incompletely, those officers are at a distinct disadvantage. This is a major problem for law enforcement and military personnel, because they cannot adequately measure how individual shooters are performing relative to the group without redoing the exercise.

For example, during some military training scenarios, a bobber-like target may be intended to pop up in front of each of the shooters for exactly two seconds, before ducking back down. Simultaneously, a loud and surprising noise is played, or another distraction is provided. If the target for shooter A remains upright for 1.9 seconds, but shooter B's target is exposed for 2.1 seconds, it is difficult to judge which has better quick-fire and target discrimination skills when faced with a startling noise. Both shooters cannot take turns firing at the same target, because the later shooter will not be surprised by the noise.

Similarly, in the case of moving targets or target carriers, the various targets on a range may tend to move at different speeds or accelerate in different manners, simply due to mechanical wear, damage, frost, or installation variances. This can result in large differences in the difficulty faced by shooters firing at these targets. An individual shooter has difficulty measuring his own progress in skill and accuracy, both over time and as compared against other shooters on the range.

Finally, ranges often receive requests for highly complex scenarios. For example, some users may request a dual running man training scenario, in which additional 'innocent bystander' targets pop up in front or behind the 'dangerous person' target. Most ranges cannot easily accommodate such a request, as the running man target carriers function according to one set of programming, while the pop up or bobbing targets respond to a different set of protocols. Moreover, current known ranges provide minimal ability to maintain synchronization of multiple targets.

Thus, there is a need for a simple, reliable, and robust new system for providing linear, rotational, and/or pivoting movement to a target carrier with improved operation and accuracy in the system. It is advantageous if many, if not all of the targets on a range, have mechanisms to report their position and velocity status to a central network, which can signal some targets to move differently in order to match nearby targets. It is further advantageous if the network is aware of faults or targets moving too slowly or too quickly, and can adjust the targets to comply with the request, cancel the program, or provide an indication that the scenario desired is unachievable in the event that some target units persist in behaving out of synch with the others. Likewise, it is desirable to have a system which can report the fault to the user, and flag misbehaving targets for maintenance. It is also an advantage if the system is flexible enough to accommodate and coordinate multiple types of target hardware on the same range.

Various embodiments described by the present specification are described in greater detail below.

SUMMARY

The present disclosure discusses control systems for various types of moveable targets which may increase the accuracy and/or reliability of the system to allow improved use in the short term and prolonged life while minimizing required maintenance.

One advantage of the present disclosure is to provide a control system for one or more track-mounted target carriers, equipped with sensors to ensure the proper position of the target carrier systems before and/or during an exercise. This may include maintaining multiple carriers in desired positions relative to one another during the exercise. An additional advantage is to provide a control system for other automated targets to ensure proper target position. Still another advantage may be providing notification when the carrier is in need of service.

One advantage of the present disclosure is to provide a control system for a rotating target to ensure that the target is being properly rotated for presentment to the shooter. This may relate to the relative position of a single target, or the positions of multiple targets relative to each other. In addition to improving presentment, the system may be able to signal the need to service a particular control system.

Yet another advantage of the present disclosure is to provide a control system for a drop target or bobber which improves accuracy of the system to better record when a target has been properly struck and/or reset. In addition, the system may indicate when servicing is required.

One more advantage of the present disclosure is to provide a control system which can adjust the behavior of individual targets of the same type, so that they move in nearly identical fashions, despite differing wear, damage, or installation idiosyncrasies. This may include, for example, increasing the speed of some actuator systems and/or reducing the speed of other actuator systems, e.g. controlling motor speed, so all of the targets are presented at substantially the same time or in the correct order.

An additional advantage is to provide a sensor suite compatible with many types of targets, which can report on the targets' velocity, position, and relative orientation and status (upright or fallen, turned broadside to the shooter or edge-on, etc.) in order to coordinate movement across an entire range and different types of targets.

The present disclosure includes different systems and methods for moving and interacting with the target system, and are thus applications of a common inventive concept. It should be appreciated that various devices, systems, methods and applications will have some benefits and may lack other benefits which are present in different devices, systems, methods and applications described herein. Therefore, the teachings of the present disclosure and any actual or intended benefit of any embodiments should not be read into the claims unless expressly stated therein.

In accordance with some aspects of the present disclosure, a method for moving and operating the target system may include: using a movement control station in conjunction with a target holder and a target carrier motor; supplying a movement control station; monitoring the movement process of at least one of the target carrier, the target carrier motor, and the movement control station; and controlling or adjusting a moving speed or distance of the target carrier; and iteratively monitoring the movement of the target carrier. The system may adjust a single target carrier to ensure that the target is in the proper location, or may be able to adjust a plurality of targets to ensure that a training scenario is properly performed.

In other embodiments, a method of moving and operating a target carrier may also include: a movement process module which has a mechanism for turning the target holder.

In yet other embodiments, the target carrier may include a primary sensor mechanism, such as a rotary encoder and a target carrier or secondary sensor; and operating the target carrier may include the steps of: providing a target carrier track; identifying a selected position along the target carrier track; using a signal from the target carrier sensor to predetermine a first end and a second end of the target carrier track; and receiving a signal from the rotary encoder, calculating a current position of the target carrier, and moving the target carrier to the selected position at a speed, the speed being variably dependent on the distance between the current position and the selected position and the time window for accomplishing the movement.

In yet other embodiments, the target carrier may include a rotary encoder and a target carrier sensor; and operating the target carrier may include the steps of: providing a target carrier rotational point; identifying a selected position of rotation; using a signal from the target carrier sensor to predetermine a first desired position and a second desired position; and receiving a signal from calculating a current position of the target carrier, and moving the target carrier to the selected position and verifying the second position by means of a sensor independent of the signal to predetermine the first desired position and adjusting the signal accordingly.

In still other embodiments, the method of operating a target carrier may include limiting a control effort of the target carrier motor; and adapting the target carrier and the target carrier motor so that they cease operation if they do not receive a confirming signal from the movement process module within about one second.

These and other aspects of the present disclosure may be realized in various motorized target control systems and methods of use as shown and described in the following figures and related description. It will be appreciated that various aspects of the invention can be used separately and that the invention is defined by the appended claims rather than this summary.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. Various embodiments of the present invention are shown and described in reference to the accompanied drawings, wherein.

Figure 1:
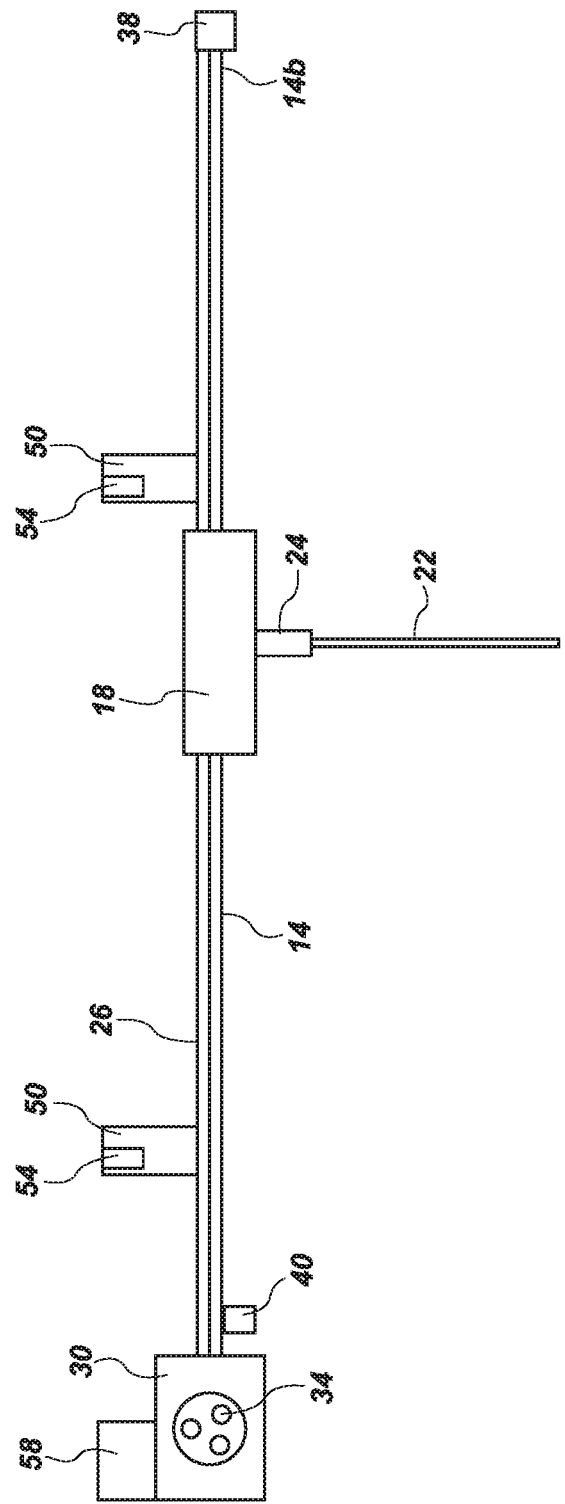
FIG. 1 shows a schematic diagram of a plurality of target actuator systems and a control system.

It will be appreciated that the drawings are illustrative and not limiting of the scope of the invention which is defined by the appended claims. The various elements of the invention accomplish various aspects and objects of the invention. It is appreciated that not every element of the invention can be clearly displayed in a single drawing, and as such not every drawing shows each element of the invention. It will be further appreciated that elements shown in different drawings may be combined as set forth in the claims.

DESCRIPTION

The disclosure and accompanying drawings are discussed below, using reference numerals to identify parts and features so as to enable one skilled in the art to practice the present invention. The drawings and descriptions are exemplary of various aspects of the invention and are not intended to limit or narrow the scope of the appended claims.

Furthermore, it will be appreciated that the drawings may show aspects of the invention in isolation and the elements in one figure may be used in conjunction with elements shown in other figures. In light of the present disclosure, the skilled artisan will understand that the methods described below can be practiced without employing these specific details, or that they can be used for purposes other than those described herein. Indeed, they can be modified and can be used in conjunction with products and techniques known to those of skill in the art in light of the present disclosure.

Reference in the specification to "one configuration," "one embodiment" "one aspect" or "a configuration," "an embodiment" or "an aspect" means that a particular feature, structure, or characteristic described in connection with the configuration may be included in at least one configuration and not that any particular configuration is required to have a particular feature, structure or characteristic described herein unless set forth in the claim. The appearances of the phrase "in one configuration" or similar phrases in various places in the specification are not necessarily all referring to the same configuration, and may not necessarily limit the inclusion of a particular element of the invention to a single configuration, rather the element may be included in other or all configurations discussed herein. Thus, it will be appreciated that the claims are not intended to be limited by the representative configurations shown herein. Rather, the various representative configurations are merely representative examples and are provided to help one of ordinary skill in the art to practice the inventive concepts claimed herein.

Furthermore, the described features, structures, steps or characteristics of embodiments or aspects of the invention may be combined in any suitable manner in one or more embodiments. In the following description, numerous specific details are provided, such as examples of products or manufacturing techniques that may be used, to provide a thorough understanding of embodiments of the invention. One skilled in the relevant art will recognize, however, that embodiments of the invention may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect must be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a track reference mark" may include one or more of such marks, and reference to "the target" may include reference to one or more of such targets.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. Likewise, a reference that something is substantially perpendicular would mean that the object is sufficiently perpendicular to carry out a particular function. The exact allowable degree of deviation from absolute completeness may in some cases depend on the specific context, such that an enclosure encircling nearly all of a wheel would be substantially enclosing, even if one side of the enclosure had a slit or channel formed along a portion thereof. The use of "substantially" is equally applicable when used in a negative connotation to refer to the complete or near complete lack of an action, characteristic, property, state, structure, item, or result. For example, structure which is "substantially" upright would either be completely upright or so nearly completely upright that the effect would be effectively the same as if it was completely upright.

Likewise, the term "generally" is used to designate something having an aspect which has more of the matter indicated than not, to perform a function or such that common usage would cover the matter indicated, but is used herein more broadly the substantially. Thus, an item may be described as generally vertical if it is sufficiently more vertical than horizontal that common language would be consistent with use of the term. Thus, for example, a slope at 60 degrees may be called generally vertical, while a slope above 75 degrees may be substantially vertical.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The invention and accompanying drawings will now be discussed in reference to the numerals provided therein so as to enable one skilled in the art to practice the present invention. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Turning now to FIG. 1, there is shown a schematic side view of a target system, generally indicated at 10, commonly referred to as a retriever. The target system 10 may be a single retriever or two or more retrievers positioned side by side. As used herein the term "target system" refers generally to the overall system, including the targets (or target mounts it targets are not present), the retrievers, the target actuator system, the control system for moving the targets, etc. The term "control system" refers to the processors, etc., which generate commands to a target actuator system to move a target. The control system may include assemblies embedded with the actuator system, such as an embedded controller, or may be remote and provide signals via wires or various wireless protocols.

The term target actuator system is intended to cover the means and mechanisms by which a target is moved into position. To this end the target actuator system may include a motor, cable, track and target carrier of a retriever, or the drive mechanism, including the motor, pistons, etc., of a turning target. A variable frequency drive may be considered to be part of a target actuator system. The target actuator system may be electromechanical, hydraulic or pneumatic. A target carrier is a portion of the target actuator system which engages the target and, in response to other portions of the actuator system, moves the target.

The target system 10 may include a target actuator system, generally indicated at 12 having one or more tracks 14 on which target carriers 18 move back and forth to move targets 22 toward and away from the shooter(s). The target carriers 18 may be self-driving, or may be driven by a cable 26. The cable 26 may be driven by a motor unit 30 to move the target carrier 18 between a proximal end 14a of the track 14 and a distal end 14b of the track. Anywhere along the track 14, a target mount 24 (if provided) may be used to rotate a target so that it is perpendicular or parallel with the track 14 and the line of fire.

A rotary encoder 34 or other measuring device may be placed on each motor unit 30 or other structure to measure the movement of the cable 26 and thereby indicate position of the target carrier 18 along the track 14. If a command is sent to move the target carrier 18 to the distal end 14b of the track 14, the motor unit 30 will operate to drive the cable 26 until the rotary encoder 34 indicates that the target carrier 18 is adjacent the distal end. Generally, it is desirable to drive the target carrier 18 quickly to avoid wasted time and to make the scenario realistic. However, if the rotary encoder 34 has calculations which are off, the target carrier 18 will not be in the proper position. It may be a foot or two short, or it may cause the target carrier 18 to ram into a stop 38 at the distal end 14b of the track 14—potentially damaging the target carrier 18, or causing the target to fall or be mispositioned.

While rotary encoders 34 and other similar devices are generally accurate, lead dust on the track, damage to the track 14 or target carrier 18 from ricochets, stretching of the cable, slippage and other issues can cause the rotary encoder to have a reading which is inaccurate. While a slippage of 1/32 of an inch may not appear to present a problem, when a target carrier 18 is moved thousands of times and the slippage occurs in one direction more commonly than the other, the disconnect between the rotary encoder's calculation and the actual position of the target carrier 18 can be significant. If the error is in one direction, the target carrier 18 will not advance a sufficient distance along the track 14 toward the distal end 14b. If the error is in the other direction, the target carrier might not advance to the proximal end 14a so that the shooter can inspect his or her target.

One common scenario is for a number of police officers to shoot at a target at a given distance for a given time. Thus, for example, if a police officer must take a qualification test at 25 feet, entering the distance of 25 feet may cause the target carrier 18 to go only 22 feet, potentially changing the timing at which that target turns, changing the difficulty caused by distance, and also potentially rendering the test invalid. While it may be appreciated that Officer A's target is not as far out as the other officers' targets, fixing the problem may be difficult without temporarily shutting down the range. Likewise, when the target carrier 18 should be returned 25 feet so that the officer may take his or her target down, the target carrier 18 is more likely to run into a stop 40 at the proximal end 14a of the trap, rather than being braked to come to rest shortly before the stop.

To resolve these concerns common to retrievers and other target systems, the present invention may utilize at least one secondary sensor 50 disposed adjacent the target actuator system. Thus, for example, as shown in FIG. 1, each of the retrievers has a pair of sensors 50 are disposed along the track 14. The sensors 50, which may be optical sensors, ultrasonic sensors or a variety of position sensors, determine when the target carrier 18 has passed by the sensors. The information regarding the target carrier's position is then sent via wiring or a transmitter/transceiver 54 and is correlated via a processor 58 with the positional estimate of the rotary encoder 34 or other primary position sensor commonly used with the motor unit 30. The estimate provided by the rotary encoder 34 can then be updated to more accurately indicate the actual position of the target carrier. Each time the target carrier moves past one of the secondary sensors 50, the estimated position of the target carrier can be updated.

The information regarding the actual location of the target carrier 18 can also be used to determine when the system 10 needs to be serviced. If the actual position sensed is repeatedly beyond a desired threshold proximally or distally from the estimated position, the system can determine that, for example, the cable 26 has stretched and is slipping as it is driving the target carrier 18. The system may then be serviced to correct the problem. Some ranges include dozens of retrievers. When one system 10 indicates that a particular retriever needs to be serviced, it can save a considerable amount of time over manually checking and servicing all of the systems at once.

While shown as a separate processor 58 for each retriever, a single processor or networked processors may be used. The processor(s) 58 may receive information from a plurality of rotary encoders 34, and sensors 50 to determine where each retriever is located. This may be updated multiple times per second so that the processor(s) 58 are always aware of the location of the target carriers 18. This can be used to provide a wide range of scenarios and to ensure that the scenario is being carried out properly. For example, one scenario may have two adjacent target carriers 18 advance to a certain point, and then one target carrier suddenly advance while the other suddenly retreats. The officer must then respond to two targets acting in different manners and adjust his or her response accordingly.

In another scenario, a large number of retrievers may be positioned side by side at a shooting range. Upon a signal, all of the target carriers 18 advance along their respective tracks to 25 yards. The processor(s) 58, however, collect information from the rotary encoder 34 and sensors 50 to determine if one or more of the targets carriers is moving at a different rate of speed than the others. If all of the target carriers turn once they have traveled 25 yards, then some of the targets will not turn at the same time, thereby interrupting the exercise. Others may ordinarily be out of place if there is slippage between the motor unit 30 and the cable 26. In response to the collected information, the processor(s) 58 can send one or more signals to: 1) indicate a fault that the scenario cannot be completed; 2) adjust the perceived position of a target carrier when it passes by one of the secondary sensors and compensate in the time period the motor unit drives the cable; 3) increase power to the motor unit 30 associated with a lagging target carrier 18 so that it catches up with the others; or 3) slow down the other motor units 30 in order to allow the lagging target carrier(s) 18 to catch up with the others. By sampling multiple times per second (e.g. every 0.03 seconds), the processor(s) 58 can often make adjustments before the lagging or mispositioned target carrier 18 is even noticed by users.

FIGS. 2 through 5 show exemplary systems 10 with various types of secondary sensors 50a-d. In each configuration, a track 14 is provided, with a stop 40 at the proximal end, a stop 38 at distal end, and a docking station 33. The target carrier 18 may include a motor 30 (including an encoder 34, not shown, which may serve as a primary distance sensor), target turning motor 56, and target 22. Each configuration uses a secondary sensor 50a which may be used to calibrate the primary sensor.

Figure 2:
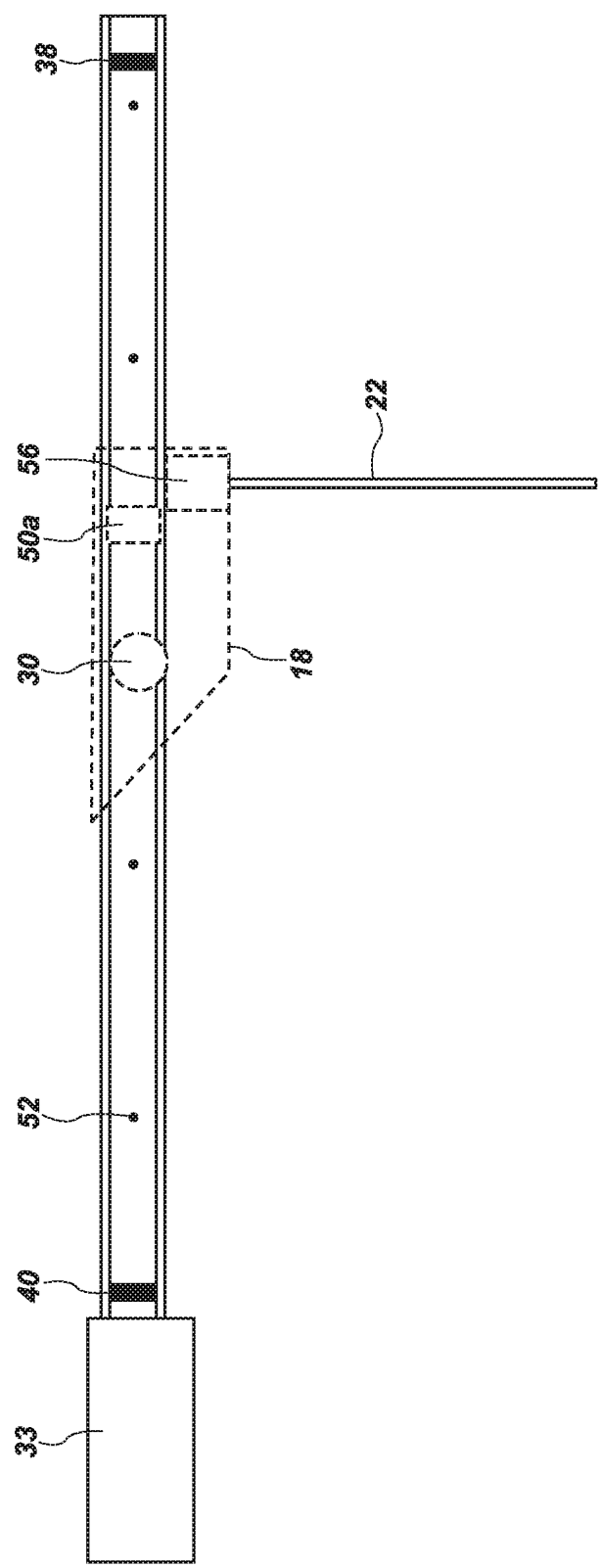
FIG. 2 shows a side view of a schematic diagram of a track with a retriever and sensor.

In FIG. 2, track reference marks 52 are provided along the length of the track 14. Such reference marks may be, for example, cut-outs in the track, marks on the track, etc. Sensor 50*a* provided on the target carrier 18 may be a track reference mark sensor.

Figure 3:
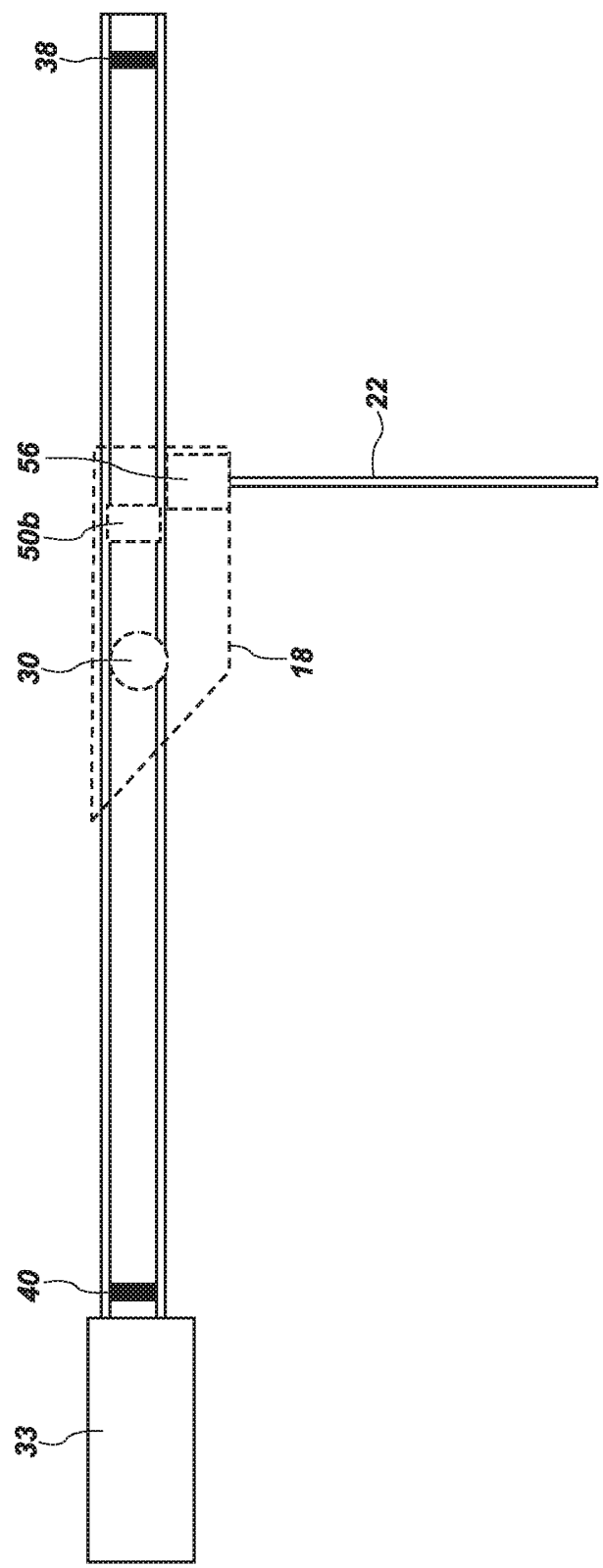
FIG. 3 shows a side view of a schematic diagram of a track with a retriever and another exemplary type of sensor.
Figure 4:
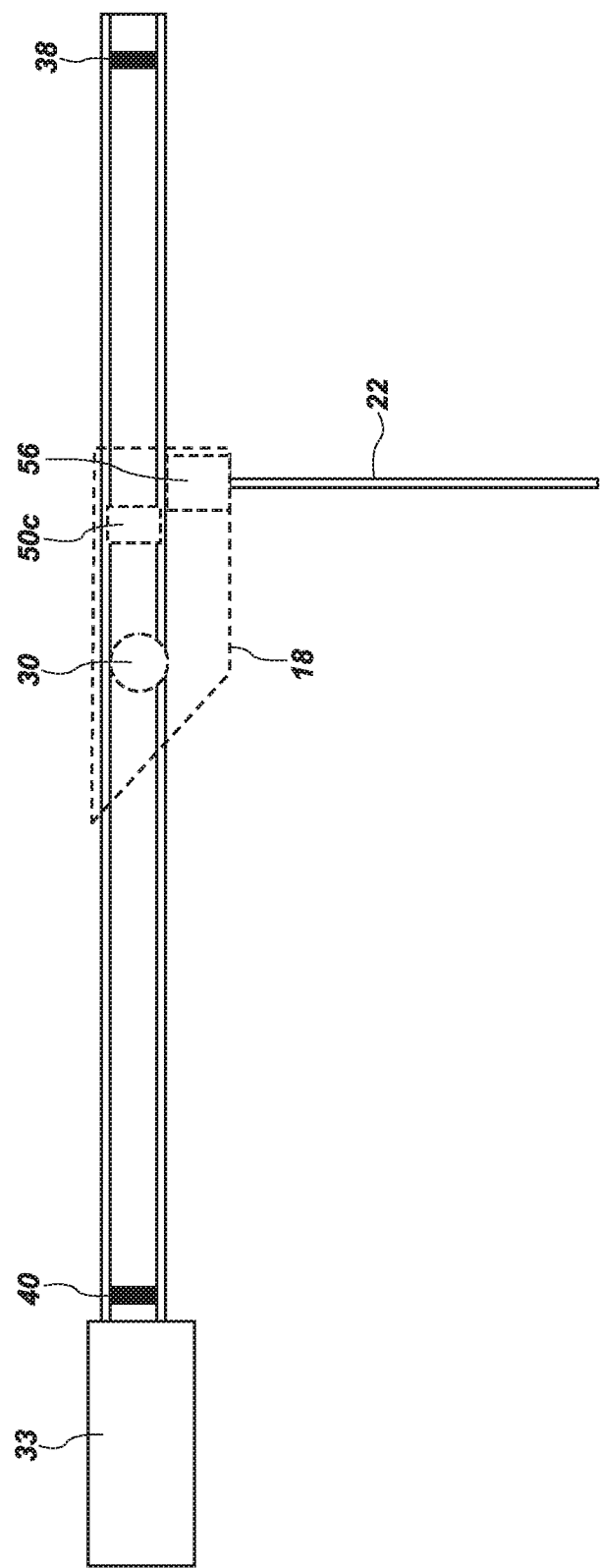
FIG. 4 shows a side view of a schematic diagram of a track with a retriever and yet another exemplary type of sensor.
Figure 5:
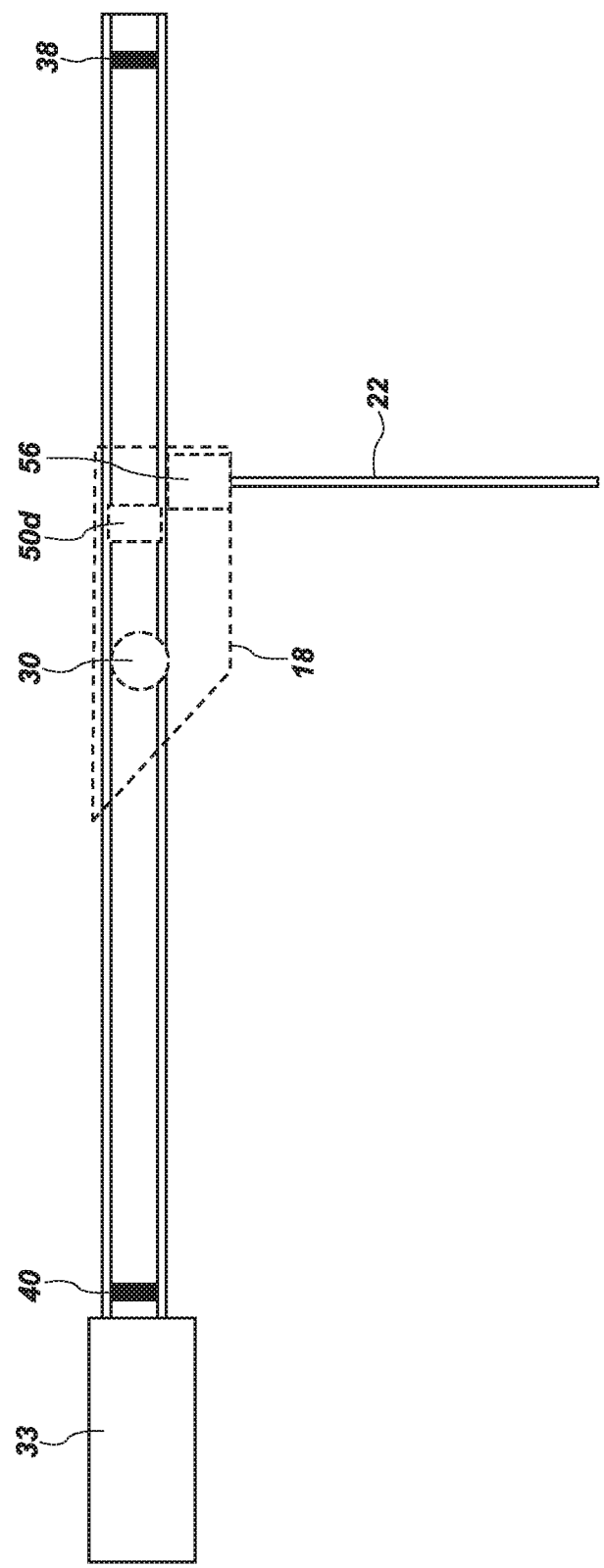
FIG. 5 shows a side view of a schematic diagram of a track with a retriever and another exemplary type of sensor.

In FIG. 3, sensor 50*b* includes an idler wheel with encoder. In the configuration shown in FIG. 4, sensor 50*c* includes a laser capable of distance measurement. For example, a laser triangulation sensor that calculates distance to its target using a CMOS chip and a known angle may be used to measure distance. In FIG. 5, sensor 50*d* may include an ultrasonic measurement device.

Figure 6:
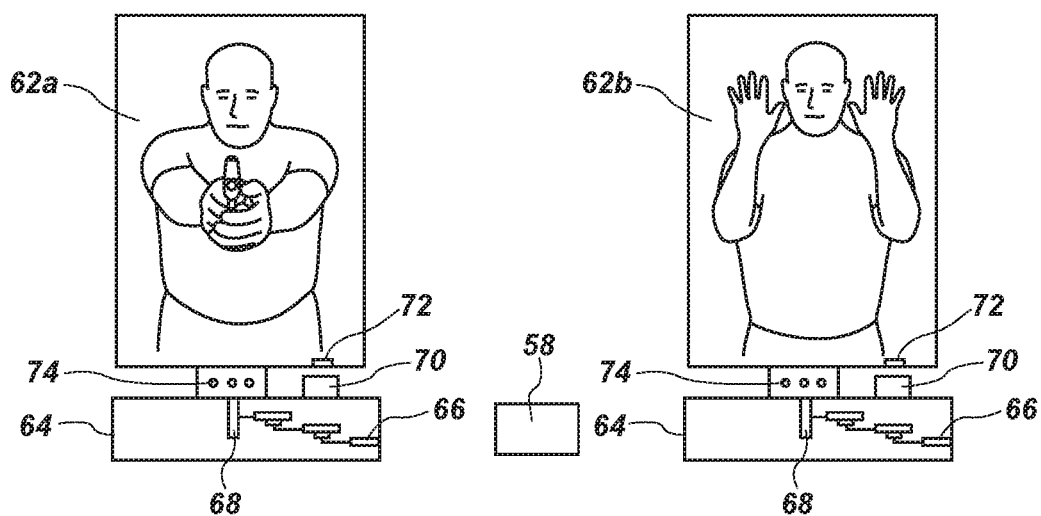
FIG. 6 shows a plurality of turning targets.

Turning now to FIG. 6, there is shown a schematic view of a turn target system, generally indicated at 60. The turn target system may include a single turn target 62 or a plurality of turn targets 62. Moreover, the turn targets 62 of the turn target system may act in unison, individually, or both.

A turn target 62 of such a system typically has at least three states. In an initial state, a target 62 is disposed parallel to the line of fire so that a shooter can only see the edge of the target. Upon actuation, the target 62 is rotated 90 degrees in one direction to show one side of the target, or is rotated 90 degrees in the opposite direction to show the opposite side of the target. Often one side of the target will show a "shoot" scenario, as shown on target 62*a*, such as a person holding a gun. The other side, as shown on target 62*b*, may have a "no shoot" scenario, such as a person holding a cell phone, or a criminal standing behind a hostage. The key to the shooting scenario is that the officer or soldier does not know what will be presented, and must quickly and accurately determine whether it is a shoot or no shoot scenario.

The target 62 is rotated between the three positions by a target actuator system 64. There are numerous types of target actuator systems 64, including both electromechanical, hydraulic and pneumatic systems. The actuator system 64 shown in FIG. 6 shows multiple pistons or motors 66 which, when actuated, rotate a drive shaft 68 in 90 degree increments. It will be appreciated that pistons, motors, or other drive elements may be used interchangeably.

In the highly demanding environment of a shooting range, however, these mechanisms can become damaged and can become worn or develop leaks over time. This loss of calibration may cause the actuator system to turn the target too much or too little. Regardless of whether a stepper motor with a rotary encoder is used or a pneumatic piston assembly 66 is used, there is an ever-increasing risk that the target will not turn in proper 90 degree increments. The rotary encoder associated with the motor may get out of alignment, one of the pistons may develop a leak, or the engagement between the drive unit (motor or pistons) and the drive shaft 68 may slip or become loose—thereby preventing the target 62 from moving into and staying in the proper position. For example, if the target 62 is not parallel to the line of fire at the initial position, the shooter may be able to see enough of the target on one side to know in advance if it is a shoot or no shoot situation on that side of the target. This limits the usefulness of the exercise.

In order to solve this problem, the turn target system 60 can be equipped with a secondary sensor system 70. The secondary sensor system 70 may be an optical or other sensor which detects when the edge of the target passes over it. Alternately, the sensor may be, for example, a Hall effect proximity sensor or a magnetic sensor, which detects a strip of metal 72 or other indicator embedded in one side of the target 62, or may be a magnet attached to the drive shaft or target clamp. Additionally, other sensor markers could be placed in the target so that the sensor system knows which side is being displayed to the shooter. Thus, the sensor may not only detect the positioning of the target 62, but also which of the faces is presented to the shooter. Alternatively, the sensor system 70 may read optical markers 74 attached to the drive shaft 68 to determine the orientation of the target 62. Regardless of the type of sensors, the sensors may be used to communicate with a processor 58 which can determine whether the target is in the correct place, whether the target is moving quickly enough, etc., and make adjustments as appropriate or signal that there is a fault situation which needs to be fixed prior to running the exercise.

In the event that the target 62 does not rotate fully, moves too slowly, etc., the output of the secondary sensor system 70 may be used to modify the motion provided to the drive shaft or other structures of the target actuator system in some embodiments. In the context of a motor, the power supplied can be adjusted to provide for the proper turning distance or speed of the target, e.g. via use of a variable frequency drive (VFD). In a piston-driven system, combinations of pistons may be used to compensate for the piston which is not functioning properly until the malfunctioning piston can be repaired or replaced. The secondary sensor system 70 may also provide an output to report a malfunction and the need for service. Additionally, the output of the secondary sensor system 70 can be used in conjunction with actuation signals to determine if the target is turning too slowly, which may indicate a leak or slippage. The secondary sensor system 70 communicates with a control system to make appropriate corrections via the target actuator system.

Figure 7:
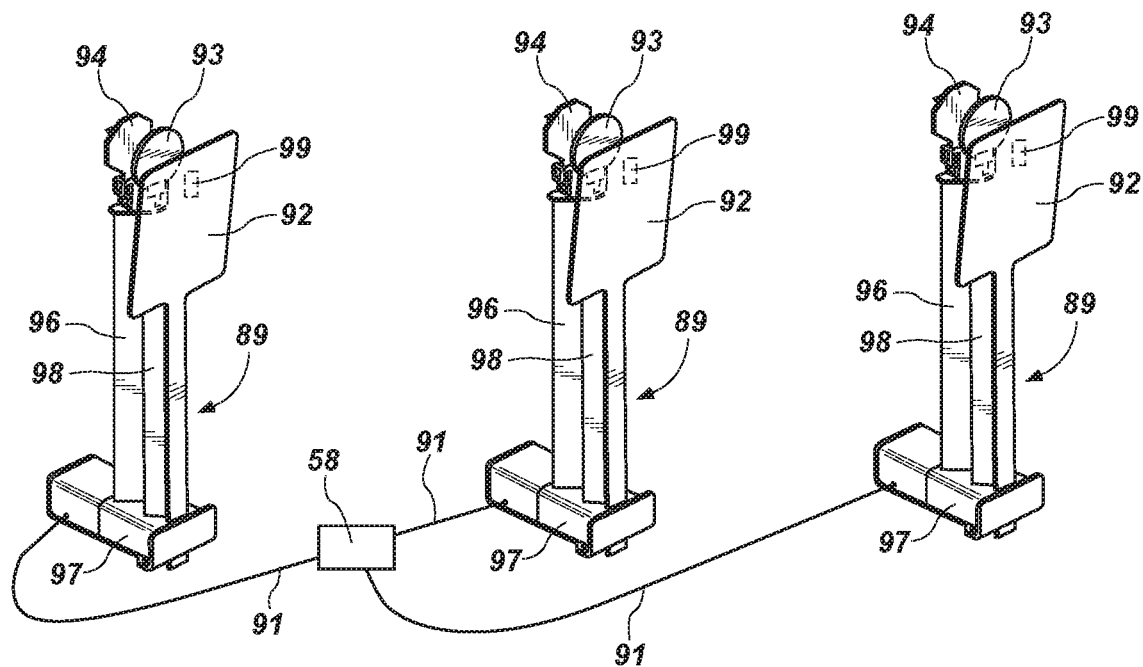
FIG. 7 shows a schematic diagram of a plurality of drop targets (also called "bobbers")

FIG. 7 shows a perspective view of a drop target system, generally indicated at 90, which includes one or more drop targets, each indicated at 89, commonly referred to as bobbers. The drop target 89 includes a chest plate 92, a front target 93, a rear target 94, a first arm 96, and a second arm 98. The first and second arms 96 and 98 are positioned behind a chest plate 92, such as those which are commonly used for pop-up targets.

Attached on top of the first arm 96 is a target 94 having a first configuration. In the embodiment shown in FIG. 7, the rear target 94 is generally octagonal. The rear target 94 is typically colored a first color, such as blue, while the front target 93 may be a different shape such as circular, and colored a second color, such as red. Each of the targets 93 and 94 may be independently raised by means of an actuator system contained within the base 97. In the presently shown embodiment, raising the targets 93 and 94 is accomplished by means of a pair of bars or rods, one located behind each of the support arms 96 and 98, and activated by means of a motor or pistons in the base 97. It will be appreciated, however, that any means known to one of skill in the art of popping the targets back into an upright position, or drawing them down again, may be used.

The drop target system 90 may be used to accurately test a shooter's reflexes, as well as their ability to discriminate between targets. For example, shooters may be instructed that the blue target represents a bystander, while the red target represents a dangerous individual. In such scenarios, the shooter must strike the red target quickly, causing it to fall, but then avoid firing a second time to hit the blue target standing directly behind the first. Across the three targets, the rear target may be blue in one, two or all three. Thus, the shooter must constantly be alert and avoid hitting a target representing an innocent bystander.

Due to wear and vibration of the drop target system 90, however, the actuator system in the base 97 may become damaged, so the actuators do not cause the targets to pop up in the correct sequence or at the correct speed. Alternately, paddles may "stick" or fail to drop all the way, so that they must be struck several times. In order to solve this problem, one or more additional or secondary sensors 99 may be provided. These may be proximity sensors, optical sensors, or the like. They may be positioned to detect only when a target paddle 93 or 94 is upright, or may be positioned to detect when a target paddle is down. In the present embodiment, if the actuator systems in the bases 97 report that they have activated to an upright position, but a sensor 99 does not detect that the paddle has been placed in an upright position in a timely manner, then the system 90 may recognize that a fault has occurred, and may either direct the actuator system(s) to activate again in an effort to clear the obstruction, or may warn the user or the range operator. Alternately, if the target paddles drop too quickly after being raised, this may indicate that the hinges have become damaged such that the force of gravity causes them to fall without ever being struck. The system 90 thus compensates for a variety of common types of damage.

The system 90 can be controlled by a processor 58 which may have communications lines 91 to each of the drop targets 89, or a wireless system may be used. Likewise, embedded controllers could be used. The processor 58 can determine the status of each of the targets and provide signals to cause the system to resolve problems at a very high rate of speed, often without the users even realizing that adjustments were made. Moreover, the processor 58 can track repeated errors and adjust for the same. For example, if one target consistently is not reset completely with the first activation of the actuator system, the processor may send signals to that actuator system to go through the actuation movement twice each time that particular target needs to be reset.

Various figures and descriptions herein indicate steps or processes that may be taken by portions of the system and the system as a whole. It will be appreciated that these steps are outlined as occurring in a particular order and as discrete steps only for illustrative purposes. Thus, many steps may be performed in a different order and/or simultaneously to achieve the desired results of the present disclosure. The listing of steps in a particular order does not mean that the process requires that particular order.

Figure 8:
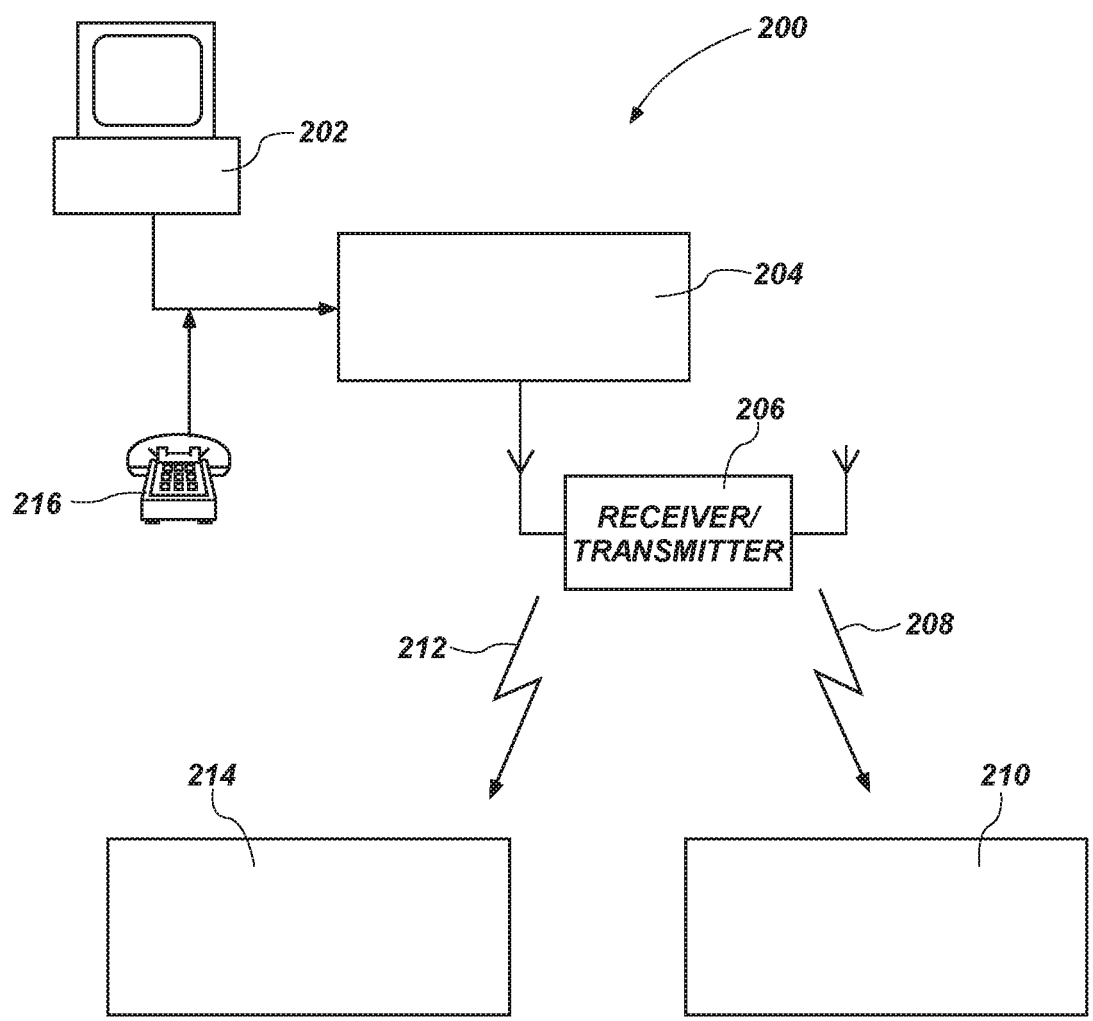
FIG. 8 shows a schematic diagram of one embodiment of a target actuator system and control system.

With reference to FIG. 8, there is shown there is shown a schematic diagram of one embodiment of an actuator system having a target carrier and target carrier movement computing control system or process module, indicated generally at 200. In FIG. 8, a target carrier movement control system may have a processor or microprocessor 202 running movement computing and control software. The microprocessor 202 may receive and transmit signals to/from a sensor system via a receiver/transmitter 206. It will be appreciated that signals may be transferred instead directly by wiring, or other means known to one of skill in the art. The receiver/transmitter 206 transmits a motor control signal 208 to control a target carrier motor 210. The target carrier motor 210 may be, for example, a Variable Frequency Drive (VFD), or other means known by one of skill in the art for moving a target carrier along a track or rail.

The receiver/transmitter 206 also emits or sends or transmits a signal 212 to control and receive data from a transmitter and secondary sensors 214. Sensors 214 may be positioned on the track itself or may be onboard the target carrier, or positioned at the end of the track. Sensors 214 may include, for example, linear variable, ultrasonic, optical, or proximity sensors, a rotary encoder, idler wheel with encoder, laser distance, and other sensors for detecting target carrier speed, location/position, target orientation, and the like.

The target carrier movement computing software 204 may further receive input from a customer service and update function, such as an internet connection 216. The customer service function may receive error codes from the movement computing software 204. Alternately and in addition, an update function may be configured to provide remote access to the software 204 to update the software version or to add functionality, for example, via a subscription service. Further, the customer service function may include recording functions. For example, if a user completes three of the five shooting programs contained in a training course, and then logs out, the customer service function may be adapted to store this data. When the customer returns, the remaining shooting programs may be highlighted or otherwise highlighted for the customer's attention.

Thus, a user at a movement control station can input a shooting program, or select from a menu of common shooting programs. Signals are then sent and received between the movement computing software, the sensors 214, and the motor 210, to result in movement to the target carrier.

It will be appreciated that in some embodiments, the microprocessor 202 and movement computing software 204 may be onboard the target carrier, or may be housed separately or remotely, and may communicate wirelessly with the target carrier and a user-operable movement computing station (not indicated). In such embodiments, the user control station may be a separate terminal equipped with an input device such as touchscreen, or a cell phone or tablet application, or other means known to one of skill in the art of inputting user commands.

It will be appreciated that the processor 202 receives the information from the sensors 214 and can make adjustments to signals sent to the target carrier motor 210 to adjust the position, direction, speed or actuation of the target carrier. Thus, for example, the target carrier motor 210 may be determined to be moving too slowly to be at a desired location in order to perform part of a scenario of a shooting exercise. In response, the processor can either 1) generate a fault message to an operator indicating that the scenario is not possible because of the position or movement of the target; 2) send signals to adjust the motor unit to speed up the target to get the target into place by the time necessary; or 3) send signals to slow down other target carriers (not shown) so that the target carrier arrives in time due to the delayed positioning of the other targets. Such a system allows a processor 202 to control an entire range and ensure that all of the targets are in position and actuated at an appropriate time to perform a training scenario.

It will be appreciated that errant target carriers can create a significant problem at a range. For example, if a shooting range has 20 lanes across and is being used for a qualifying test in which the target advances 25 feet, turns for 3 seconds, returns to its original position and retracts, any officer whose target does not advance to the proper location, turn at the proper time and return will have to retake the certification. Moreover, the error may negatively impact the other officers. If the target in lane 3 turns prematurely, the officer in that lane will start firing, thereby distracting the other officers whose targets have not yet turned. If the target in lane 14 remains exposed to the officer for longer than 3 seconds, the results of the test will not be accurate and may result in an officer passing the test who should not have passed. If the target in lane 10 only advanced half way to the desired location, the misplaced target may be distracting to the officers in lanes 9 and 11. By providing a plurality of position, motion and/or other sensors, the processor 202 can better control the testing conditions or warn in advance if the scenario chosen in not possible.

Figure 9:
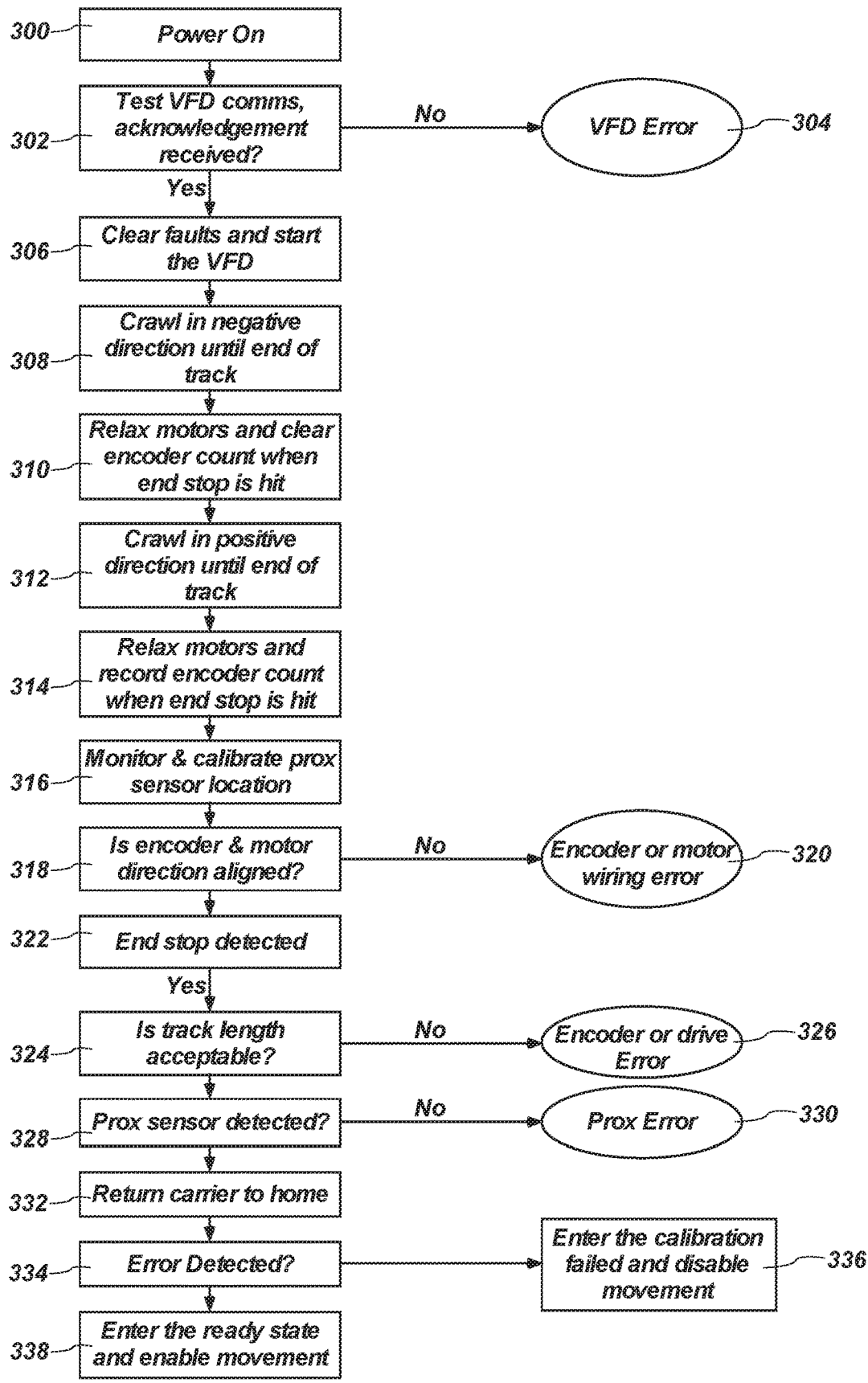
FIG. 9 shows a flow chart of one embodiment of actions carried out by movement computing software and the target actuator system and its associated electronics on startup.

Turning now to FIG. 9, there is shown a flow chart of one embodiment of actions carried out by a movement computing software associated with a target carrier and electronics with which it is in electrical communication, enabling the target carrier to be self-calibrating on startup. Coding such software would be readily accomplished in light of the present disclosure.

At 300, the startup calibration begins when the target carrier is powered on. The target carrier then tests operating status of the drive motor (302). In the present embodiment, the drive motor may be a variable frequency drive (VFD) with onboard comms or an embedded controller. It will be recognized, however, that any type of motor suitable for moving the target carrier along the overhead rail track may be used. In the event of a VFD error 304, the target carrier software system returns an error. During the calibration phase, this error occurs when the target carrier reaches the end of the stop at the end of the track or rail, because the motor is pulling on the carrier but no movement results. This error notifies the movement computing software that an end of the track has been reached.

In the event the motors report ready, the target carrier movement computing system clears faults 306 and starts the VFD motors to move the cable and the target carrier mounted thereto.

At 308, the sensors associated with the target carrier register a first end of the track when sensors detect that the target carrier reaches the end of the track. This may be accomplished by, for example, increased resistance on the motors, by a triggered bumper system, a position sensor or other means known to one of skill in the art. One advantage of using the error produced by increased resistance on the motors as described above (during the calibration phase) as a signal that the target carrier has reached the end of the track is that the error can be averaged over a sliding window.

In some embodiments, the error registered by the carrier motor during step 304 is averaged over several hundred sensor transmissions, or a few seconds of the target carrier contacting the end stop. Even if the target carrier vibrates somewhat due to motion as it contacts the end stop, the sliding window average of the increased resistance against the motor will remain steady. However, if the target carrier contacts fallen debris on the track, such as leaves or twigs, the sliding window average of the error will not remain steady, indicating that a user must check the track.

When the target carrier has contacted the first end of the track, the target carrier movement computing software then 310 clears or resets to zero the value recorded by a rotary encoder or other mechanism commonly used to determine position or movement. The rotary encoder may be, for example, an absolute multi-turn rotary encoder, a quadrature encoder, or the like. It will be appreciated that other means of translating mechanical linear movement into an electrical signal may be used, such as a laser distance sensor, ultrasonic measurement, etc.

At 312, the motor pull is reversed, so that the target carrier crawls or moves along the track in the opposite direction. In some embodiments, a Hall effect or similar proximity sensor may be stationary and mounted to the track. Other secondary sensors such as optical sensors, etc., may also be used. When the target carriage crosses over the proximity sensor, the sensor triggers, and the movement computing software records the signal and requests the rotary encoder position. At 314, when the end of the track is reached, the target carrier movement computing software records the rotary encoder value and stops the target carrier motor. At 316, the target carrier movement computing software calls a function to monitor and calibrate the rotary encoder with the proximity sensor.

The 316 step ensures that, at the calibration stage, the movement computing software recognizes the rotary encoder readout that correctly matches to the location of the proximity sensor mounted on the track. During later usage of the target carrier, after the calibration, the movement computing software compares the current rotary encoder readout with the proximity sensor location each time the target carrier passes the proximity sensor. Thus, even if the rotary encoder becomes inaccurate over time—a common problem when rotary encoders are used to measure location when a distance is traveled back and forth repeatedly—the software corrects or readjusts the rotary encoder value. In the pictured embodiment, the target carrier is therefore constantly self-calibrating with each pass over the checkpoint or proximity sensor, even after days or weeks of uninterrupted use.

At 318, the movement computing software checks to ensure that the rotary or linear encoder value is aligned with the motor direction. A relatively simple wiring error may result in the encoder of a target carrier, for example, transmitting a negative value when the correct value is positive. Alternately, a motor may be reverse-wired. In either case, locating the mis-wiring and correcting it may take considerable installation time. The check at 318 compares the target carrier location (as reported by the increased resistance against the motor or other means of registering when a target carrier has reached one end of the track) with the value transmitted by the rotary coder. If necessary, at 320, the software may apply a value correction and return to the steps of the self-calibration and startup sequence. The software-level correction may thus accommodate wiring mistakes that previously could require many hours to correct.

At 322, the target carrier movement computing system detects the second end of the track, and then at 324 compares the recorded distance between the first and second ends of the tracks. If there are certain mechanical faults in the target carrier system, (for example, the motor will operate only for a short time, causing the target carrier to stop along the track) the recorded distance will not approximately equal the true length of the track. In this case, the track length is not acceptable, and at 326 the system returns an error and places the target carrier on standby.

At 328, the system runs a second check of the proximity sensor, and at 330 returns an error if a proximity sensor is not detected. The system then returns the carrier to home at 332. Home may be the original starting location, or may be for example the most commonly-used shooting distance from the shooter for a particular track or range, or may be the location of the proximity sensor which is typically located at a midpoint distance along a track. At 334, the system checks for any fatal errors recorded during self-calibration and startup, and will either mark the self-calibration as failed and output a warning at 336, or mark success and place the target carrier in a ready state at 338.

Figure 10:
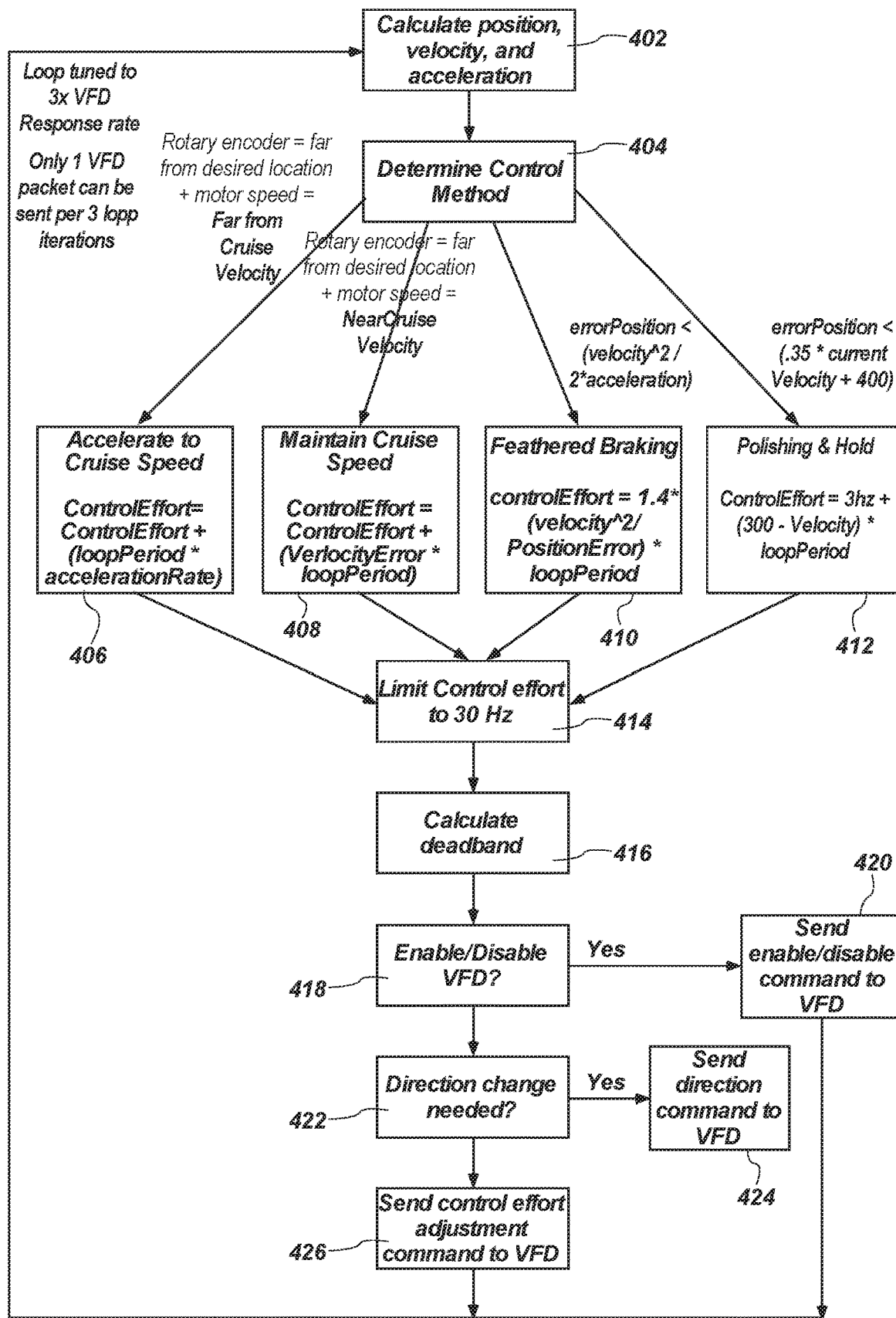
FIG. 10 illustrates one embodiment of a flowchart for a system for the coordination of a target actuator system with a motor and movement computing software.

FIG. 10 illustrates a flow chart of one embodiment of a system for the coordination of a target carrier with a motor and movement computing software. During the startup self-calibration sequence (FIG. 5) and at any time that a user wishes to direct the movements of the target carrier, the target carrier motor (such as a variable frequency drive (VFD)) must respond to the movement computing software. In some systems, such as those with a simple "forward and back" toggle, this response is jerky and irregular. In order to smooth out the motion of a target carrier, the movement computing software calculates 402 the position of the target carrier with respect to the desired endpoint, and the current velocity and acceleration applied by the motor. It then determines at 404 which type of motor control method to apply.

If the target carrier is far from the desired location (as reported by the rotary encoder) and far from the maximum cruise velocity (as reported by the motor speed), the movement computing software then directs the motor to accelerate 406, provided that 414 the control effort (voltage or current applied to motor actuators) is limited to the range recommended for the particular motor. In this control method, the control effort may be accelerated by the equation:

controlEffort=controlEffort+(accelerationRate×loopPeriod)

Because acceleration rate and loop periods are constant, the control effort is increased at a linear rate, providing smooth constant acceleration up or down to the cruising speed.

By monitoring the control effort applied by a motor, the control effort thus functions as an additional (albeit comparatively error-prone) target position sensor. The control effort also acts like a throttle. In the pictured embodiment, the motor is a variable frequency drive (VFD) with a recommended control effort limited to 30 Hz. It will be appreciated, however, that more or less robust motors, and other types of motors, may be used.

If the target carrier is outside an acceptable threshold from the desired position (as reported by the rotary encoder), but is at or near maximum velocity (as reported by the motor speed), the movement computing software directs (408) the motor to maintain cruise speed, provided that the control effort (voltage or current applied to motor actuators) is limited to the range recommended for the particular motor (414). This acceptable threshold from the desired position is dynamic, and may depend, for example, on the speed of the trolley. Typically, it may be between three and ten feet.

Accurate cruising velocity may be maintained through use of the equation:

controlEffort=controlEffort+(VelocityError×loopPeriod)

(VelocityError) in the equation above is a signed number that represents the difference between the current velocity, and desired velocity (which may be directed/programmed by a user). (loopPeriod) in the equation scales this number down since the calculation is typically being made many times per second. This equation allows the cruising velocity to be either increased slightly or decreased slightly when the velocity is not equal to the ideal cruising velocity.

As the target carrier approaches the desired position, as indicated by the rotary encoder, the movement computing software directs (410) the motor to apply feathered braking, provided that the control effort (voltage or current applied to motor actuators) is limited to the range recommended for the particular motor (414). The following equation may be used to determine the distance at which feathered braking can be applied:

$$errorPosition < \frac{velocity^2}{2 \times acceleration}$$

Velocity squared divided by two times the acceleration may provide an appropriate distance (errorPosition) which brakes need to be applied to stop at the correct position. In these equations, (errorPosition) is equal to the desired position minus the current position.

Once it has been determined the carrier is in the braking zone (determined by equation above), the feathered braking control method is used. An equation for control of the feathered braking may be $$controlEffort = gain \times \frac{velocity^2}{errorPosition} \times loopPeriod$$

In this equation, (controlEffort) is the application of the brakes on the carrier, (errorPosition) is the distance of the carrier from the desired location, and (loopPeriod) is a number which allows the calculation to be scaled, as the calculation is typically made several times per second. The gain may be a suitable multiplier, and in one configuration a 1.4 multiplier may work. Suitable gains may be experimentally obtained for a specific configuration, depending on the type of motor, length of track, etc., and any suitable "gain" or multiplier may be used. This equation may allow additional braking to be applied if the carrier is not decelerating fast enough, and/or less braking to be applied in the carrier is decelerating too fast.

As the target carrier grows very close to the desired position as indicated by the rotary encoder, the movement computing software directs (412) the motor to apply very little force (again provided that the control effort is limited to the range recommended for the particular motor (414)). This "polishing mode" is typically entered into between 1 and 5 feet. An equation for calculating the distance in which polishing mode is entered is defined by the equation:

errorPosition<0=gain×currentVelocity+offset

According to experimental data, an appropriate gain may be 0.35, and an appropriate offset may be 400. The 0.35 factor is an experimentally obtained value, used to scale the number down according to experimentally obtained numbers. Any gain or appropriate factor may be used. The addition of 400 is also an experimentally obtained value, indicative of the appropriate offset. The 400 generally ensures that 400 millimeters away from the desired position will always be in polishing mode. Any appropriate offset value may be used.

When in this mode, the motion equation used may be controlEffort=feed forward+(Vref−currentVelocity)×loopPeriod This equation may allow lower maximum control effort values, which may result in slower and more fine-tuned control of the carrier when it is close to the desired position. The "feed forward" may be, for example, 300 where the particular VFD used cannot produce movement if the controlEffort is below 300. In this equation, Vref is ±600 when greater than 200 mm from the desired position, and ±300 when less than 200 mm away from the desired position. These particular values were experimentally obtained for a specific system, and one with skill in the art will appreciate that any suitable numbers for a particular system may be used for scaling the equations to that system.

This slow final stop step results in a polished look to the target carrier movement. The reduction in jolting or jarring stops reduces the risk of the target falling out of the target holder, and can reduce wear and tear on the system from stress induced by jolts or jerking, as well.

The movement computing software then calculates the deadband or error band (416)—that is, the difference between the target carrier's position as measured by the rotary encoder and the relative location of the proximity sensor. The deadband is the area contained within about 4 inches of the desired position. If the carrier is within about 4 inches of the desired position, it will report as being "at position" and will make no attempt to move the carrier. This may avoid "hunting" of the carrier, or the carrier moving back and forth across the desired position since it cannot be precise enough to achieve the position exactly. The deadband allows the carrier to stop and rest when it is "close enough" to the desired position. For example, during the calibration phase outlined above, if the proximity sensor triggered when the rotary encoder output was 2503, and now triggers when the rotary encoder output is 2505, the difference is 2. The movement computing software thus deducts 2 from the values reported by the rotary encoder, resulting in a target carrier system which self-calibrates with every pass over the proximity sensor.

In the event that the target carrier does not pass over the proximity sensor, despite repeated movement as reported by the rotary encoder, the movement computing software may flag the target carrier. This may occur if, for example, the target carrier is moved back and forth repeatedly but only over a small portion of the track each time. During a prolonged idle period, the movement computing software may therefore direct the target carrier to travel slowly down the length of the track to seek out the proximity sensor.

This self-calibration behavior prevents the location inaccuracies common in target carriers, which often resulted in the target carrier colliding repeatedly against an end stop at one end of the track. Because the collisions may damage even a robustly-built target carrier over time, the self-calibration of the present disclosure is a strong advantage.

If the motor, such as a VFD, needs to be disabled (418) (e.g., because an error has been detected) or enabled (e.g., due to timeout) the appropriate command (420) is sent to the motor and the loop is repeated. If the software determines that a directional change is required (422) in order to move the target carrier to the new position specified by the user, the movement computing software then directs (424) the motor to reverse directions and the loop is repeated.

If the direction does not need to be changed, and no enable/disable command is needed, the software then sends (426) the appropriate control effort adjustment command packet (calculated in one of steps 406, 408, 410, and 412) to the motor (a VFD, in the pictured embodiment) and repeats the loop. As drawn, the loop may limit the number of control packets sent to the motor to the response rate of the motor. However, the loop may be run more often than the response rate, and the results averaged over these loops. In the pictured embodiment, the loop is run at triple the motor's response rate. The result is particularly smooth-looking, crisp target carrier movement, further enhancing the aesthetic effect and reducing the chance that sudden jolting will jostle the target from the target carrier or damage the system.

Figure 11:
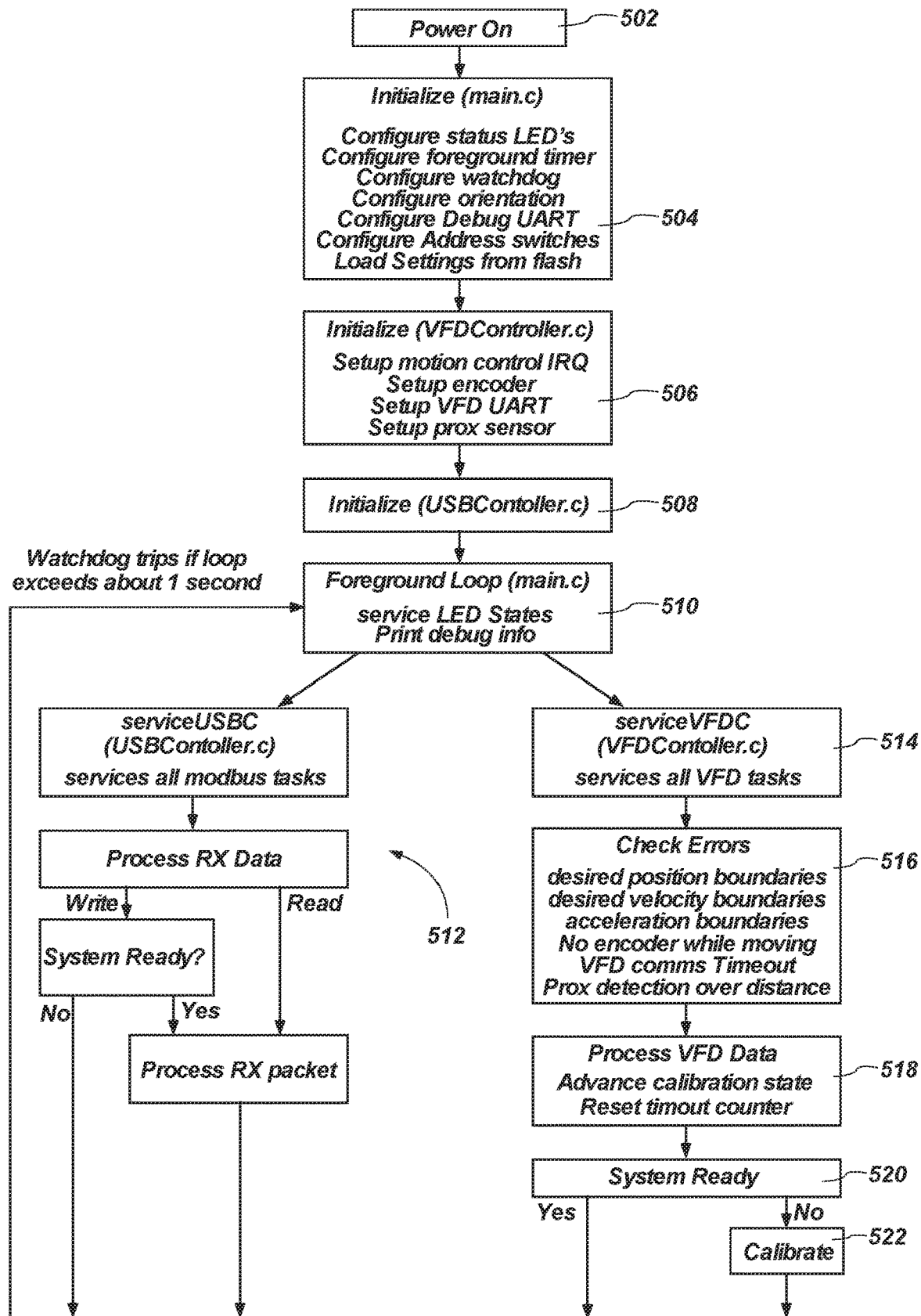
FIG. 11 illustrates a flow chart for one embodiment of a watchdog system for coordinating the movement of a target carrier with a movement computing station.

FIG. 11 illustrates a flow chart for one embodiment of a watchdog system for coordinating the movement of a target carrier with a movement computing station. As explained above, redundant cutoff mechanisms help prevent the target carrier and motor from engaging when there has been damage to another part of the system. In the pictured embodiment, such cutoff systems are engaged at the time the system is powered on (502). The movement computing software engages (504) status indicator lights which may be located in a control room or on individual target carriers, and configures other functions such as the internal timer, watchdog loops, orientation of the target holders, debug, address switches, etc.

The movement computing software then initializes (506) motion control, rotary encoder, and motor control receiver/transmitter (VFD UART (universal asynchronous receiver/transmitter) in the pictured embodiment) functionalities. Thereafter, the system initializes (508) standard driver and controller scripts (only the function USBController.c is listed in the image for clarity, however it will be appreciated that many such scripts may be initialized depending on the chipset and the programming language). One advantage of initializing several safety features, such as the proximity sensors and watchdog function (described in further detail below) before the main controllers is that the target carrier and motor will not be activated before the safety features are in place.

The movement computing software then adjusts (510) the states of indicator LEDs and outputs system status and debug information. In the pictured embodiment, the watchdog loop, generally indicated at 512, includes monitoring the status of Modbus® (or other serial communication protocol) tasks over RX channels. In general, the serial communication protocol slaves in the system (e.g., the motor and target carrier sensors and their associated transmitters/receivers, such as one or more UARTs) must respond to the movement computing software within about one second. If they do not, the watchdog loop 512 trips. The watchdog loop may either positively halt any other responding slaves in the RX channel, or the safety feature may be coded as a deadman trigger, in which a lack of communication from the movement computing software automatically halts or cuts power to all non-responsive slaves. Coding such software would be readily accomplished in light of the disclosure.

At 514, which may be executed in a parallel process, motor tasks are initialized (here indicated as VFD tasks). At 516, the movement computing software performs error checks, and sets any position, velocity, and acceleration boundaries as discussed in FIG. 6. Provided these checks return no errors, the system is ready (520), and proceeds (522) to the calibration step as discussed in more detail in FIG. 5.

It will be appreciated that, although the functions of FIGS. 4-7 are discussed above in relation to a target carrier, the same functions may be readily adapted for other target systems, such as bobbers or turning targets. In such instances, the function steps should be read as referring to the hardware previously discussed for such target systems. For example, in a turning target, rather than the variable frequency drive (VFD) returning an error in step 304 of FIG. 5, the same error may be returned by a sensor that determines whether a piston has fired (i.e., has been actuated). Moreover, it will be appreciated that the processor may complete the steps discussed above for a number of target carriers substantially simultaneously and may make adjustments to the operation to correct for determined errors or deficiencies. In the alternative, the processor may generate a fault and remove the defective carrier from service so as to not interrupt training with a malfunctioning part of the system. The operator of the range may be placed on notice that the failing target carrier needs maintenance.

Figure 12:
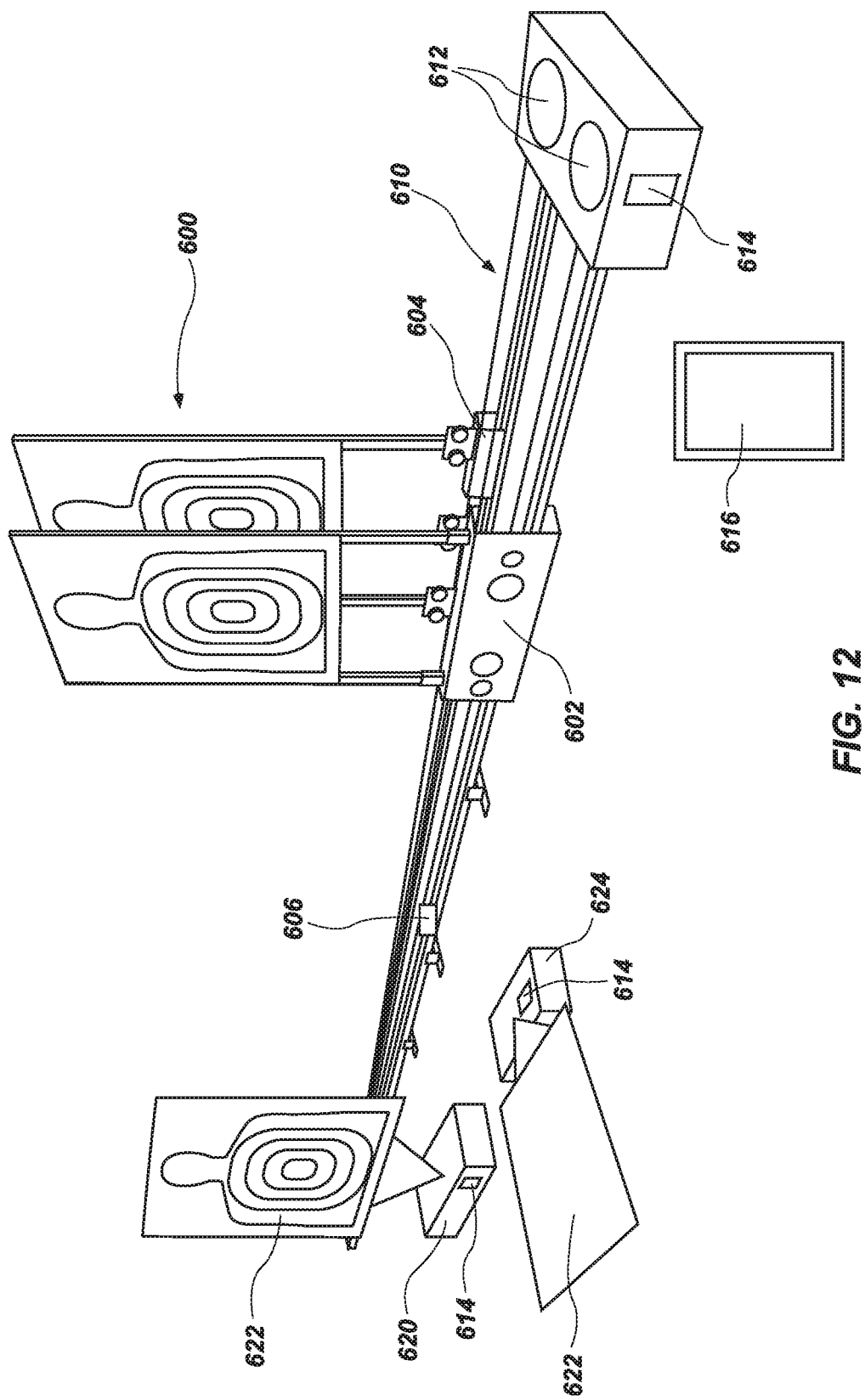
FIG. 12 illustrates one embodiment of a dual running man target and control system.

Turning now to FIG. 12, there is shown an embodiment of a pair of track-mounted target carriers in a 'dual running man' system, generally indicated at 600. The target carriers 602 and 604 run along opposing sides of the same track, generally indicated at 600, which may be curved or straight, but generally extends laterally across a shooter's field of vision. The forward-most target carrier 602 typically carries a target configured to represent an innocent bystander or hostage, while the rearmost target carrier 604 carries a target configured to represent a hostile gunman. In some embodiments, both targets represent hostile figures.

In order to present complex training scenarios, the target carriers 602 and 604 must move in a highly coordinated fashion—for example, when a shooter wishes to simulate a gunman hiding behind a hostage and simultaneously dragging the hostage along, or pushing the hostage away and running. Similar to the discussion in FIG. 1, a secondary sensor 606 may be used to check the absolute position of the target carriers each time they cross over the sensor.

The target carriers 602 and 604 may be self-driving or may be drawn along a cabled track, generally indicated at 610, by motors 612—in the pictured embodiment, the motors are variable frequency drives (VFDs), though other motors can be used. The motors 612 may include embedded controllers. The motors may include a radio-frequency (RF) transponder 614 or other transponder or output device, which is in electronic communication with a server (not shown) and a user control device 516, such as a tablet or phone.

As described in FIGS. 8-11, using data generated by the secondary sensor 606, the rotary encoders (not shown) and the motors 612, the position, velocity, and acceleration of the target carriers can all be constantly and accurately monitored, and controlled via the embedded controllers in the motors 612, in accordance with a user-selected target behavior program. In the event that the target carriers are unable to complete the movement programs as directed, the program can flag a fault (e.g., FIG. 9, step 304), and return the target carriers to their home state. Where one or both of the target carriers 602 and 604 are out of position, but such can be corrected, the processor or controller 616 can send signals to the motor unit to correct positioning. By sampling at a high rate (e.g. 30 times per second), the adjustments may be made before a human can perceive that one of the target carriers is not in the proper position, or at least as quickly as possible based on the available data from the sensors.

In addition, the pictured embodiment of the target system includes a turning target carrier 620 and a pop-up target carrier, 624, equipped with sensors to monitor target position, in accordance with the present disclosure. The data from these may be distributed to the network message brokering bus, such as Modbus®, via receiver/transmitters 614. As previously discussed, a server may coordinate the messages sent to all receiver/transmitters 614 via the Modbus®, in order to raise or rotate the additional targets 622 when the target carriers 602 and 604 pass predetermined points. This synchronized behavior has the advantage of allowing a user to select challenging training scenarios from a controller 616 such as a tablet or laptop, such as a hostile gunman moving rapidly through a crowd. Synchronicity errors may be flagged as indicating that the slow target requires maintenance. Additionally, the system may accommodate and correct for small synchronicity errors by momentarily pausing or slowing the faster target units, until the slow one can catch up.

Thus, the constant monitoring of target positions and statuses as herein described enables the coordination of many types of targets to a common, user-programmable network. The fault-recognition functions of the software enable a training program to be aborted and the targets to be reset and flagged for maintenance, if synchronicity cannot be maintained.

A further advantage of the target system of the present disclosure is that the system is self-healing. Minor faults, such as a dropped transmission, may cause one target to momentarily move more quickly or more slowly (e.g., the watchdog loop 512 of FIG. 11 may trigger, causing power to be momentarily cut to a motor or target actuator system). However, the presently-disclosed target system can sample and adjust target speed or trigger a target actuator system as quickly as the sensors and embedded controllers permit—typically 30 times a second, for many embedded controllers. Thus, power to the motor of a slow target carrier may be increased, speeding the target carrier so that it catches up and synchronizes with other target carriers, or with other types of targets on the same network. If a turn target does not turn on its correct cycle, the network can recognize the fault and instruct the target actuator system to attempt to fire or actuate again on the next cycle, $\frac{1}{30}$th of a second later. On such time scales, any effect on the synchronicity of the targets running the program is essentially invisible.

Figure 13:
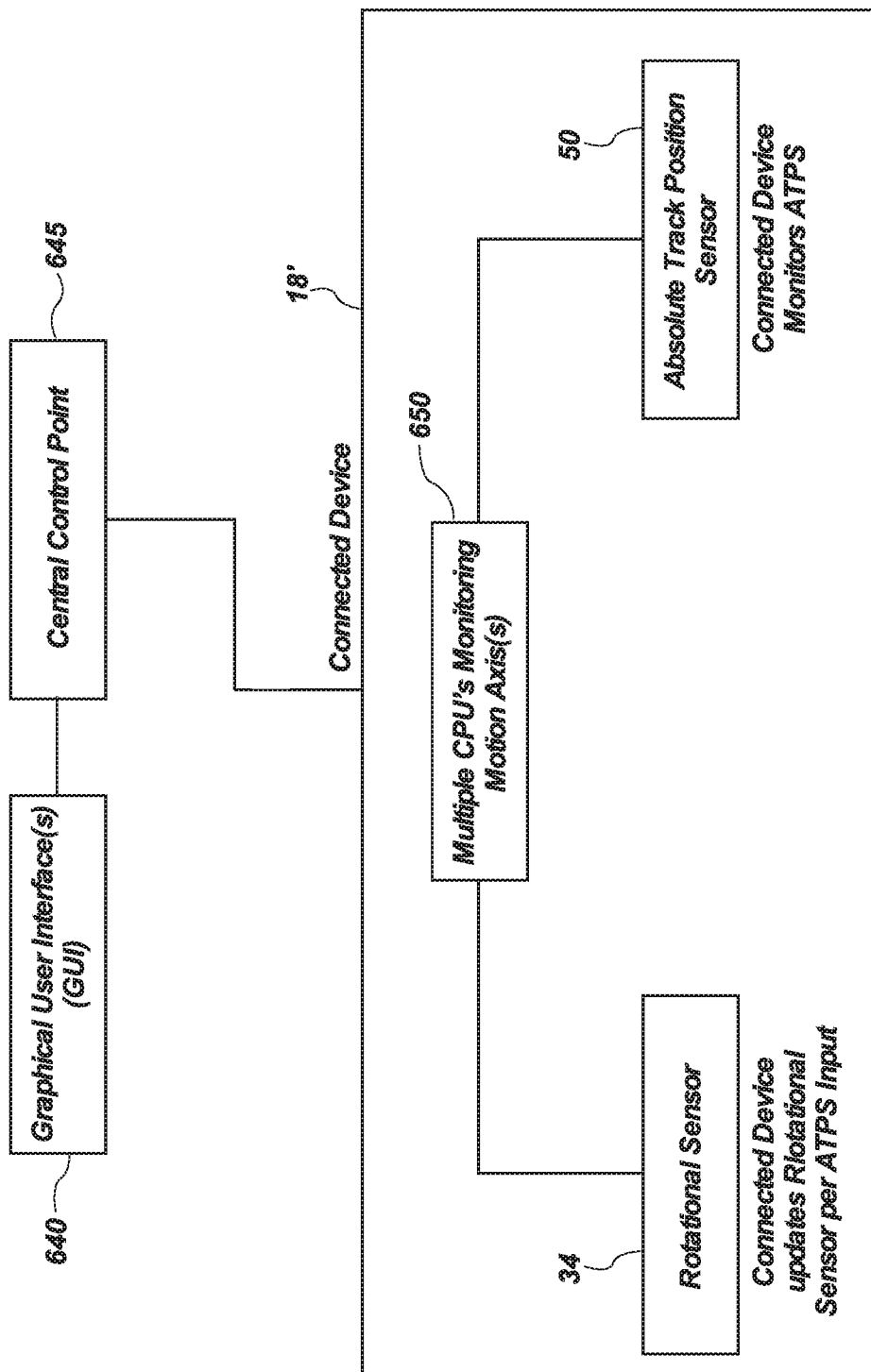
FIG. 13 shows a schematic diagram of a central control network.

The system may also coordinate with a central network. For example, FIG. 13 shows a schematic diagram of an embodiment that includes a graphical user interface 640. The interface may be positioned, for example, at a shooting stall. The graphical user interface 640 may be in communication with a central control point 645. The central control point 645 may further be in communication with a connected device, such as a target retriever or carrier 18'. Such device may include one or more CPUs 650 monitoring one or more motion axes. A rotational sensor such as an encoder 34 may be in communication with the one or more CPUs, as well as an absolute track position sensor 50. The rotational sensor 34 may be updated according to the input received regarding the absolution track position sensor 50, and this may also be communicated to a central control point 645 for monitoring and overall health of the range.

It will be appreciated that the functional steps taken by the software has been disclosed above. These functional steps may be executed by various modules, or equivalent functional units. Modules are at least partially implemented in hardware, in one form or another. For example, a module may be implemented in a processor have a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented using software, stored on a physical storage device (e.g., a computer readable storage medium), for execution by various types of processors. Reference to a computer readable storage medium may take any physical form capable of storing machine-readable instructions, at least for a time in a non-transient state, on a digital processing apparatus. Examples of a computer readable storage medium include, but are not limited to, a semiconductor or solid state memory, magnetic tape, a removable computer diskette, a random access memory (RAM), a read-only memory (ROM), a Bernoulli drive, ARDUINO, a magnetic disk, flash memory, integrated circuits, or other digital processing apparatus memory device, and an optical disk. Current examples of optical disks include a compact disk with read only memory (CD-ROM), a compact disk with read/write (CD-R/W), and a digital video disk (DVD).

An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Software modules may include script, batch, or other executable files that may be stored on a computer-readable storage medium or in a computing system. In some embodiments, these software modules may configure a computing system to perform one or more of the exemplary embodiments disclosed herein.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices which are referred to herein as computer readable media and/or electronic data storage devices.

In some embodiments, the software portions are stored in a non-transitory state such that the software portions, or representations thereof, persist in the same physical location for a period of time. Additionally, in some embodiments the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Furthermore, the described features, structures, functions or characteristics of embodiments or implementations of the invention may be combined in any suitable manner in one or more embodiments or implementations. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams discussed above are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Those skilled in the art will recognize various modifications which could be made to the embodiments disclosed herein without departing from the scope and spirit of the invention. The following claims are intended to cover such modifications.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a target carrier comprising:
    selecting a target system having the target carrier, a motor disposed in communication with the target carrier, at least one sensor and at least one processor, the at least one sensor including a sensor associated with the motor to determine an estimated location of the target carrier based on movement of the motor;
    actuating the motor to move the target carrier; and
    periodically sensing a position of the target carrier to determine a sensed location; and
    adjusting signals sent to the motor in light of the sensed location of the target carrier.

2. The method of claim 1, wherein the method comprises changing a speed at which the motor moves the target carrier in response to a sensed signal that the target carrier is not in the estimated location.

3. The method of claim 1, wherein the at least one processor determines a speed of the target carrier and sends signals to the motor to adjust the speed at which the target carrier moves based on a difference between the estimated location and the sensed location.

4. The method of claim 1, wherein the at least one sensor indicates that the target carrier has not reached a desired position and the at least one processor activates the motor to continue movement of the target carrier.

5. The method of claim 1, wherein the target carrier moves along a track and wherein the method comprises sensing a location of the target carrier along the track, comparing the sensed location to the estimated location and correcting the estimated location.

6. The method of claim 5, wherein the method comprises adjusting the motor in light of the sensed location.

7. A method of operating a target carrier comprising:
selecting a target system having the target carrier, a motor disposed in communication with the target carrier, at least one sensor and at least one processor;
actuating the motor to move the target carrier; and
periodically sensing a position of the target carrier to provide a sensed position; and
adjusting signals sent to the motor in light of the sensed position of the motor; and
wherein the method comprises selecting a plurality of target carriers disposed in communication with a plurality of motors, and wherein the at least one processor receives signals from at least one sensor, determines relative positions between the target carriers and sends signals to at least one motor to modify at least one of the position or a speed of travel of one target carrier in response to sensed location or speed information.

8. The method of claim 1, wherein the target carrier moves along a target carrier track and wherein at least one of the motor and the target carrier comprises a rotary encoder and a target carrier sensor; and further comprising the steps of:
identifying a selected position along the target carrier track;
receiving a signal from one or more of the rotary encoder and the target carrier sensor indicative of a location of the target carrier; and
calculating a current position of the target carrier, and moving the target carrier to the selected position at a speed, the speed being variably dependent on a distance between the current position and the selected position.

9. The method of claim 1, further comprising the steps of:
limiting a control effort of the motor disposed in communication with the target carrier; and
wherein the target carrier and the motor are adapted to cease operation if they do not receive a confirming signal from the at least one processor within a predetermined period of time.

10. A method of coordinating a movement of a target with a command of a user comprising:
selecting a target system having a first target, an actuator system having a first embedded controller, a first target position sensor, and a secondary target position sensor, and a processor programmed to detect a fault;
signaling the first embedded controller; and
controlling the actuator system to affect a behavior of the first target in response to a signal received from the secondary target position sensor.

11. The method of claim 10, the first target position sensor having a first target output and the secondary target position sensor having a second target output and the method further comprising:
comparing the first target output of the first target position sensor and the second target output of the secondary target position sensor; and
adjusting a first value of the first target position sensor to conform to a second value determined by the second target position sensor.

12. The method of claim 10, wherein the target system includes a second target having a second actuator having a second embedded controller, a second target position sensor, and a second proximity sensor, the second proximity sensor having a second target output and the second actuator having a second target output, and wherein the method includes utilizing the processor to compare the first target output to the second target output to detect a fault;
signaling the first embedded controller and the second embedded controller; and
controlling the second actuator to affect a behavior of the second target.

13. A target system comprising:
at least one target carrier;
at least one target actuator system having a motor disposed in communication with the at least one target carrier and a sensor disposed in communication with the motor for providing an estimated position of the at least one target carrier based on movement of the motor;
at least one sensor disposed in communication with the at least one target actuator system which periodically senses an actual location position of the at least one target carrier; and
at least one processor running a program to determine an estimated position of the at least one target carrier based on movement of the motor, to periodically receive an updated location position from the at least one sensor disposed in communication with the at least one target actuator system, and to correct the estimated position to the updated location position, and adjust signals sent to the motor to adjust a position of the at least one target carrier.

14. A target system comprising:
at least one target actuator system having a motor disposed in communication with at least one target carrier;
at least one sensor disposed in communication with the target actuator system; and
at least one processor, the processor running a program to determine an estimated position of the at least one target carrier, to periodically receive an updated location position, and to correct the estimated position to the updated location position, and adjust signals sent to the motor to adjust the position of the at least one target carrier; and
wherein the at least one target carrier comprises a plurality of target carriers, and wherein the processor is programmed to compare a position or speed of a first target carrier of the plurality of target carriers and a position or speed of a second target carrier of the plurality of target carriers and adjust drive signals sent to the motor associated with the first target carrier to adjust the speed or position of the first target carrier in response to determined position or speed of the second target carrier.

15. The target system of claim 14, wherein the target system comprises a track and a plurality of sensors disposed along the track.

16. The target system of claim 14, wherein the plurality of target carriers comprises drop target systems.

17. The target system of claim 14, wherein the at least one target actuator system comprises a turn target system.

18. The target system of claim 14, wherein the at least one target actuator system includes a plurality of track-mounted target carriers and a plurality of target turners.

19. The target system of claim 14, wherein the at least one target actuator system includes track-mounted target carriers and drop target carriers.

20. The target system of claim 14, wherein the plurality of target actuator systems includes turn target carriers and track-mounted carriers.

21. A non-transient computer readable medium containing data and instructions for causing a computer to perform method steps to control a speed and a location of a track-mounted target carrier, the method comprising the steps of:
- calibrating an absolute track position sensor of the track-mounted target carrier to form a calibrated absolute track position sensor;
- receiving at a central controller an instruction from a user to move a target to a predetermined location;
- sending instructions to the track-mounted target carrier to move the target to the predetermined location; and
- comparing an actual location of the track-mounted target carrier determined by the calibrated absolute track position sensor with the predetermined location.

22. The non-transient computer readable medium of claim 21, wherein the predetermined location is calculated by a rotary encoder.

23. The non-transient computer readable medium of claim 21, further comprising the step of sending an instruction to the central controller when the actual location of the track-mounted target carrier is different than the predetermined location.

24. The non-transient computer readable medium of claim 22, further comprising the step of sending instructions to the track-mounted target carrier to adjust.

* * * * *